(12) United States Patent
Cotten et al.

(10) Patent No.: US 7,797,191 B2
(45) Date of Patent: Sep. 14, 2010

(54) PROMOTIONAL EVENT TRACKING SYSTEM

(75) Inventors: Sandra Cotten, Huntington Beach, CA (US); Caroline Nakken, Whittier, CA (US)

(73) Assignee: Mass Connections, Inc., Cerritos, CA (US)

( * ) Notice: Subject to any disclaimer, the term of this patent is extended or adjusted under 35 U.S.C. 154(b) by 1127 days.

(21) Appl. No.: 11/059,746

(22) Filed: Feb. 17, 2005

(65) Prior Publication Data

US 2005/0192883 A1    Sep. 1, 2005

Related U.S. Application Data

(63) Continuation-in-part of application No. 10/013,826, filed on Dec. 7, 2001.

(60) Provisional application No. 60/269,047, filed on Feb. 15, 2001, provisional application No. 60/305,805, filed on Jul. 16, 2001, provisional application No. 60/336,340, filed on Oct. 18, 2001.

(51) Int. Cl.
*G06Q 30/00* (2006.01)
*G07G 1/14* (2006.01)

(52) U.S. Cl. ................ 705/14.5; 705/14.55; 705/14.57; 705/8; 705/65; 705/41; 705/44; 705/9; 705/11; 705/32; 235/380; 235/375; 235/379; 235/381; 235/487; 235/492; 235/493; 709/203; 709/227; 709/228; 380/225; 713/168

(58) Field of Classification Search ...................... 705/14
See application file for complete search history.

(56) References Cited

U.S. PATENT DOCUMENTS

| 4,654,793 | A | 3/1987 | Elrod |
| 4,723,212 | A | 2/1988 | Mindrum et al. |
| 5,025,372 | A | 6/1991 | Burton et al. |
| 5,056,019 | A | 10/1991 | Schultz et al. |

(Continued)

OTHER PUBLICATIONS

Mesmer, Ellen, *The good, the bad and the ugly of p-cards*, Network World, Farmingham, Aug. 23, 1999, vol. 19, Issue 34, four pages.

(Continued)

*Primary Examiner*—Lynda Jasmin
*Assistant Examiner*—Nathan C Uber
(74) *Attorney, Agent, or Firm*—Knobbe, Martens, Olson & Bear, LLP

(57) ABSTRACT

This invention relates to the methods of coordinating and tracking product and service demonstrations. An event coordinator directs event operators to conduct a product or service demonstration event. The event coordinator provides event operators with cards, such as debit cards, credit cards, or smart cards, to purchase items needed for the demonstration. The event operator contacts a card administration system to activate the card. The card administration system verifies that the provided card ID and event ID are valid, and associates an authorized budget of the demonstration event with the card. The event operator then purchases items with the card, and conducts demonstrations. Event data is provided to the parties involved in the demonstration such as a product manufacturer or service provider, the event coordinator, a staffing agency, the event operator, and a retail store. The event data includes, for example, items purchased for demonstration using the card, items purchased by customers during the demonstrations, and time information.

18 Claims, 32 Drawing Sheets

U.S. PATENT DOCUMENTS

| | | | |
|---|---|---|---|
| 5,117,353 | A | 5/1992 | Stipanovich et al. |
| 5,255,182 | A | 10/1993 | Adams |
| 5,255,183 | A | 10/1993 | Katz |
| 5,397,881 | A | 3/1995 | Mannik |
| 5,500,513 | A * | 3/1996 | Langhans et al. ........... 235/380 |
| 5,508,977 | A | 4/1996 | Tymn |
| 5,550,359 | A | 8/1996 | Bennett |
| 5,592,376 | A | 1/1997 | Hodroff |
| 5,646,839 | A | 7/1997 | Katz |
| 5,649,114 | A | 7/1997 | Deaton et al. |
| 5,649,118 | A | 7/1997 | Carlisle et al. |
| 5,687,323 | A | 11/1997 | Hodroff |
| 5,717,867 | A | 2/1998 | Wynn et al. |
| 5,748,908 | A | 5/1998 | Yu |
| 5,749,075 | A | 5/1998 | Toader et al. |
| 5,798,508 | A | 8/1998 | Walker et al. |
| 5,893,080 | A | 4/1999 | McGurl et al. |
| 5,903,633 | A | 5/1999 | Lorsch |
| 5,978,768 | A | 11/1999 | McGovern et al. |
| 5,995,965 | A | 11/1999 | Experton |
| 6,032,134 | A | 2/2000 | Weissman |
| 6,038,547 | A | 3/2000 | Casto |
| 6,049,776 | A | 4/2000 | Donnelly et al. |
| 6,052,675 | A | 4/2000 | Checchio |
| 6,078,891 | A | 6/2000 | Riordan et al. |
| 6,185,545 | B1 | 2/2001 | Resnick et al. |
| 6,272,467 | B1 | 8/2001 | Durand et al. |
| 6,289,340 | B1 | 9/2001 | Puram et al. |
| 6,325,292 | B1 | 12/2001 | Sehr |
| 6,334,133 | B1 | 12/2001 | Thompson et al. |
| 6,422,463 | B1 | 7/2002 | Flink |
| 6,502,745 | B1 | 1/2003 | Stimson et al. |
| 6,567,784 | B2 | 5/2003 | Bukow |
| 6,735,570 | B1 | 5/2004 | Lacy et al. |
| 6,751,650 | B1 | 6/2004 | Finch et al. |
| 6,829,596 | B1 | 12/2004 | Frazee |
| 7,024,395 | B1 * | 4/2006 | McCown et al. .............. 705/65 |
| 7,043,443 | B1 | 5/2006 | Firestone |
| 7,444,305 | B2 * | 10/2008 | Cotten et al. .................. 705/41 |
| 2001/0001856 | A1 | 5/2001 | Gould et al. |
| 2001/0034630 | A1 | 10/2001 | Mayer et al. |
| 2002/0046341 | A1 | 4/2002 | Kazaks et al. |
| 2002/0072946 | A1 | 6/2002 | Richardson |
| 2002/0082925 | A1 | 6/2002 | Herwig |
| 2002/0156725 | A1 | 10/2002 | Harara |
| 2002/0169720 | A1 | 11/2002 | Wilson et al. |
| 2002/0169747 | A1 | 11/2002 | Chapman et al. |
| 2003/0046249 | A1 | 3/2003 | Wu |
| 2003/0050043 | A1 | 3/2003 | Ohrstrom et al. |
| 2003/0055755 | A1 | 3/2003 | Shuder et al. |
| 2003/0061163 | A1 | 3/2003 | Durfield |
| 2003/0074287 | A1 | 4/2003 | Shuder et al. |
| 2003/0229583 | A1 | 12/2003 | Cotten et al. |
| 2004/0139318 | A1 | 7/2004 | Fiala et al. |
| 2004/0204948 | A1 | 10/2004 | Singletary et al. |
| 2004/0205023 | A1 | 10/2004 | Hafer et al. |
| 2005/0192883 | A1 | 9/2005 | Cotten et al. |
| 2005/0209014 | A1 | 9/2005 | Kim |
| 2005/0222904 | A1 | 10/2005 | Cotten et al. |
| 2006/0010023 | A1 * | 1/2006 | Tromczynski et al. .......... 705/8 |
| 2006/0047551 | A1 | 3/2006 | Cotten et al. |
| 2009/0083156 | A1 | 3/2009 | Cotten et al. |

OTHER PUBLICATIONS

Abbey, Charles Marc, *Energizing the purchasing card, Credit Card Management*, New York, Apr. 1998, vol. 11, Issue 1, five pages.

Colpitts, Suzanne N., *New generation plastic cards programs, The Armed Forces Comptroller*, Alexandria, Summer 1998, vol. 43, Issue 3, four pages.

Hintz, Klaus, *Put it on my card, please, CMA*, Hamilton, Apr. 1998, vol. 72, Issue 3, five pages.

Craven, Robin E., et al., *The Complete Idiot's Guide to Meeting and Event Planning*, Alpha Books: 2001.

Mesmer, Ellen, "The good, the bad and the ugly of p-cards," Network World. Framingham: Aug. 23, 1999. vol. 16, Issue 34, pp. 42, 1 pg.

Abbey, Charles Marc, "Energizing the purchasing card," Credit Card Management, New York: Apr. 1998, vol. 11, Issue 1, pp. 40, 3 pgs.

Colpitts, Suzanne N., "New Generation plastic cards programs," The Armed Forces Comptroller, Alexandria: Summer 1998, vol. 43, Issue 3, pp. 29, 2 pgs.

Hintz, Klaus, "Put it on my card, please," CMA, Hamilton: Apr. 1998, vol. 72, Issue 3, pp. 18, 3 pgs.

Craven, Robin et al., "The Complete Idiot's Guide to Meeting and Event Planning," Alpha Books: 2001.

http://www.ralphs.com/ralphscard_signup.htm (last accessed Jun. 1, 2004).

Janet Adamy, Albertsons starts loyalty card, raising privacy concerns, Sep. 25, 2002, http://www.contracostatimes.com (last accessed Jun. 1, 2004.).

Lee Svitak Dean, Demos in stores are important in food marketing, Minneapolis Star Tribune, Apr. 15, 1987.

Mass Connections name Entrepreneur of the Year for 1998; PR Newswire, Jul. 14, 1998.

Applegate, Jane, Sppd-Fed Marketing: In-Store Food Demonstrations Entice Consumers With Taste of New Products, Los Angeles Times, Jul. 10, 1989, vol. 108, No. 219.

Major, Meg, Show and Tell-AND-SELL, Progressive Grocer, vol. 81, No. 1, Jul. 2002.

MassConnections.com Web Pages, Mass Connections, Inc., 2000, Retrieved from Archive.org, Jun. 11, 2009.

* cited by examiner

EVENT MANAGEMENT 902

| EVENT ID 904 | EVENT STATUS 906 | EVENT STARTING DATE 908 | EVENT ENDING DATE 910 | AUTHORIZED BUDGET 912 | AGENCY ID 914 | CARD NUMBERS 916 |
|---|---|---|---|---|---|---|
| E001 | CLOSED | 01/01/2001 | 01/01/2001 | $20 | JIM'S AGENCY | 111111111 |
| E002 | OPEN | 06/30/2001 | 07/04/2001 | $50 | JOE'SGENCY | 222222222 |
| E003 | OPEN | 07/01/2001 | 07/01/2001 | $35 | TIM'S AGENCY | 123456789,234567890 |
| E004 | CLOSED | 09/01/2001 | 09/02/2001 | $100 | LEE'S AGENCY | 777777777,88888888..... |

TODAY'S DATE: 07/01/2001

FIG. 9

CARD MANAGEMENT 1002

| CARD ID | PIN NUMBER | CARD STATUS | BALANCE | AGENCY ID | EVENT ID |
|---|---|---|---|---|---|
| 123456789 | 6789 | BLOCKED | 0 | TIM'S AGENCY | E003 |
| 111111111 | 1111 | DEACTIVATED | 0 | JIM'S AGENCY | E001 |
| 222222222 | 2222 | ACTIVATED | $50 | JOE'S AGENCY | E002 |
| 333333333 | 3333 | ACTIVATED | $25 | JOE'S AGENCY | E002 |

Info for Extension: Store A USA, 11/13/2005

Order Name: Holiday Solutions
Version Number: 508118.18
Extension Number: 508118.18001

Version Name: Store A W/Signature Brands
Extension Date: 11/13/2005

[Show All Events] [Show New Events] [Show Modified Events] [Received Selected] [Receive All] [Download Events]

| Event# | Event Status | Reported Status | Fin Status | Agency | Retailer | Str# | Location | Sched Date | Actual Date | Response Status | Modified Fields | Updated |
|---|---|---|---|---|---|---|---|---|---|---|---|---|
| 3497907 | Completed | Completed | Peding | 1266 | Store A | 2884 | 806 W Tropical Pkwy Las Vegas, NV 89149 | 11/13/2005 | 11/13/2005 | Received | •MC_CARD_BUDGET MODIFIED FROM 0' TO 36' ON Oct 5, 2005 4:23PM | 2005-16:23: |
| 3497910 | Pending | Not Reported | Peding | 1266 | Store A | 2838 | 540 Marks St Henderson, NV 89014 | 11/13/2005 | | Received | •MC_CARD_BUDGET MODIFIED FROM 0' TO 36' ON Oct 5, 2005 4:23PM | 2005-16:23: |

| File | Edit | View | Go | Favorite | Help |

Back Forw... Stop Refresh Home Search Favorite Print Font Mail

Info for Extension: Store A USA, 11/13/2005

*1610* *1612* *1614* *1616*
| Extension | Events | Computer Link | Analysis | Alert/Addendum/Updates |

Order Name: Holiday Solutions
Version Number: 508118.18
Extension Number: 508118.18001 — *1618*

Reported Status: [ --All-- ▼ ]

No-Data Events:
4 items found, displaying 1 to 4

| Event# | Event Status | Reported Status | Financial Status | Response Status |
|---|---|---|---|---|
| 3497910 | Pending | Not Reported | Pending | Received |
| 3497986 | Pending | Not Reported | Pending | Received |
| 3499483 | Show-up | Not Completed | Pending | Received |
| 3499495 | Pending | Not Reported | Pending | Received |

*1660*

[ Save Page ] [ Download ] [ Cancel ]

Event's extensions 500510.01001

| Event# | Agency | Retailer | Store# | Location | City | State | Event Date |
|---|---|---|---|---|---|---|---|
| 1715891 | 1266 | Chain C | 123 | 352 W Siebenthaler | Dayton | OH | 11/3/2005 |
| 1715892 | 1523 | Chain C | 245 | 450 Brandt Pk | Dayton | OH | 11/3/2005 |
| 1715893 | 1266 | Chain C | 255 | 979 116th St/Cumberland | Fishers | IN | 11/6/2005 |

FIG. 18C

PROMOTIONAL EVENT TRACKING SYSTEM

RELATED APPLICATIONS

This application is a continuation-in-part of U.S. patent application Ser. No. 10/013,826 filed Dec. 7, 2001, which claims the benefit under 35 USC §119(e) of U.S. Provisional Application No. 60/269,047, filed Feb. 15, 2001, and U.S. Provisional Application No. 60/305,805, filed Jul. 16, 2001, and U.S. Provisional Application No. 60/336,340, filed Oct. 18, 2001, each of which are hereby incorporated by reference herein in their entirety.

BACKGROUND OF THE INVENTION

1. Field of the Invention

The invention relates generally to the methods for remotely managing financial expenditures by employees, and more particularly to the methods for coordinating product and service demonstrations.

2. Description of the Related Art

A number of companies such as product manufacturers, product distributors, marketers, service providers, and the like use event coordinators to coordinate product demonstrations in public areas such as retail stores or public parks. In a typical scenario, the event coordinator directs event operators to buy the demonstration products from retail stores and distribute or demonstrate the products within the retail stores on a given date for a given time duration. The manufacturer or the event coordinator may specify the location and time of the demonstration event. For example, a cooking utensil manufacturer asks an event coordinator to coordinate an event demonstrating its cooking utensils. The event coordinator then directs event operators to go to a retail store, purchase the cooking utensils, purchase food, and present a food preparation demonstration in the retail store with the purchased cooking utensils and food. Typically the event operator sets up a booth with promotional items and advertisements, so that the event operator can introduce and promote the products. Often the event operator distributes products to customers of the retail store at a reduced price or free of charge.

For certain promotional events, the event coordinator provides the event operator with requirements or instructions for the event operator to prepare and distribute the product in a specific public place, such as a public park or retail store, at a specific time as called for by the promotional event. The event coordinator may also provide the event operator with, for example, sample product to prepare and distribute, disposable utensils to distribute with the samples, sanitary gloves to use when handling the product, coupons to distribute with the samples, and promotional items and advertisements to display when preparing and distributing the product.

The event operator is usually an employee of an agency contracted by the event coordinator. In other embodiments, the event operator is an employee of the event coordinator, a product manufacturer, a service provider, or a retail store. The term "employee" as used in the present application is a broad term having its ordinary meaning and includes independent contractors. In typical situations, the event coordinator will utilize an agency's event operators, because the event coordinator does not have its own employees physically located in the geographical locale in which the products are to be demonstrated. For certain promotional events, the event operators are provided funds, typically in the form of cash or checks, for buying the demonstration products.

The event operators need to be provided funds to purchase necessary items in order to conduct the demonstration event. Credit cards can be used to make purchases without the use of cash. However, many conventional credit cards do not deduct the purchase amount from a sum of money held by the consumers. Rather, credit cards in effect provide a loan to the consumer to be paid back at a later time. If credit cards are provided to the event operators to make required purchases, the event coordinator cannot control the amount and nature of purchases. Debit cards allow a consumer to make a purchase for products without the use of cash by directly deducting the purchase amount from the consumer's bank account. Debit cards also provide a similar advantage to credit cards in that a record of purchases can be tracked according to usage of the card. With cash purchases, only the consumer can keep track of the purchases by collecting receipts.

A company desiring to promote its products or services may hire the event coordinator to manage promotional events that demonstrate certain products or services in, for example, hundreds or thousands of retail stores located throughout the United States or elsewhere. For such large promotions in stores around the country, the event coordinator may use many agencies. The event coordinator must rely on the trustworthiness of the agencies to direct employees to the demonstration locations. The event coordinator and/or the agencies must also rely on the trustworthiness of the event operators to use the provided funds to purchase the demonstration products, instead of using the funds for their personal purposes. The event coordinator and/or the agencies must further rely on the trustworthiness of the event operators to work in the specified demonstration locations on the specified dates for the specified time periods.

Occasionally, event operators arrive at the specified demonstration locations on the specified dates but are not permitted to conduct the demonstration events. For example, a retail store manager may not allow an event operator to setup a particular promotional event because the manager was not previously notified of the event or of the products or services which were to be included in the demonstration. Thus, it may be difficult to determine whether or not the event actually occurred, whether or not the retail store manager was notified of the event, and how much the event operator, agency and event coordinator should be paid for the event.

SUMMARY OF THE INVENTION

The present invention relates to systems and methods for coordinating and tracking promotional events so as to provide parties involved in the promotional events with useful event data. In certain embodiments, the event data is provided in real-time to the parties so as to allow timely evaluation of the other parties' participation in the promotional events. According to an embodiment of the invention, a method is provided for coordinating promotional events. The method includes receiving a request to organize a promotional event and assigning an agency to staff the promotional event with an event operator. The event operator is assigned an event card that uniquely identifies the event operator. The method further includes receiving data associated with the event card from the event operator. The data includes time information verifying the event operator's participation in the promotional event. The method also includes providing the data to the agency through one or more web pages.

In an embodiment, a computer-implemented method of generating orders is provided for promotional events. The method includes providing a graphical user interface accessible over a computer network. The graphical user interface comprises selectable entries for a plurality of attributes associated with promotional events. The method also includes receiving selections from a user for one or more of the selectable entries, providing the selections to a card administration system, providing event cards to event operators, and instructing the event operators to use the event cards to conduct the promotional events.

In an embodiment, a method is provided for staffing a promotional event. The method includes assigning an event operator having an event card to participate in a promotional event. The event card uniquely identifies the event operator and the promotional event. The method also includes tracking the event operator's use of the event card to participate in the promotional event.

In an embodiment, a method is provided for coordinating promotional events. The method includes receiving a request via a network to organize a promotional event, assigning an agency to staff the promotional event with an event operator, receiving event data from the event operator, and providing the event data to the agency through one or more web pages.

Other features and advantages of the present invention will become apparent to those of ordinary skill in the art through consideration of the following description, the accompanying drawings, and the appended claims. Not all of the features or advantages described above or discussed below are required in any particular embodiment of the present invention. Neither this summary nor the following detailed description purports to define the invention. The invention is defined by the claims.

BRIEF DESCRIPTION OF THE DRAWINGS

Systems and methods which embody various features of the invention will now be described with reference to the following drawings, in which:

FIG. 9 illustrates one embodiment of a computer screen for maintaining event records in a card administration system;

FIG. 10 illustrates one embodiment of a computer screen for maintaining card records in a card administration system;

FIG. 15 is a general representation of a computer user interface for accessing event data organized by extensions;

FIGS. 16A-16D are general representations of a user interface for coordinating and tracking event data corresponding to an extension;

FIGS. 17A-17D are general representations of a user interface for coordinating and tracking event data for specific events;

FIGS. 18A-18C are general representations of user interfaces for tracking event data for specific retail stores or specific chains of retail stores;

DETAILED DESCRIPTION OF THE PREFERRED EMBODIMENT

Figure 1:
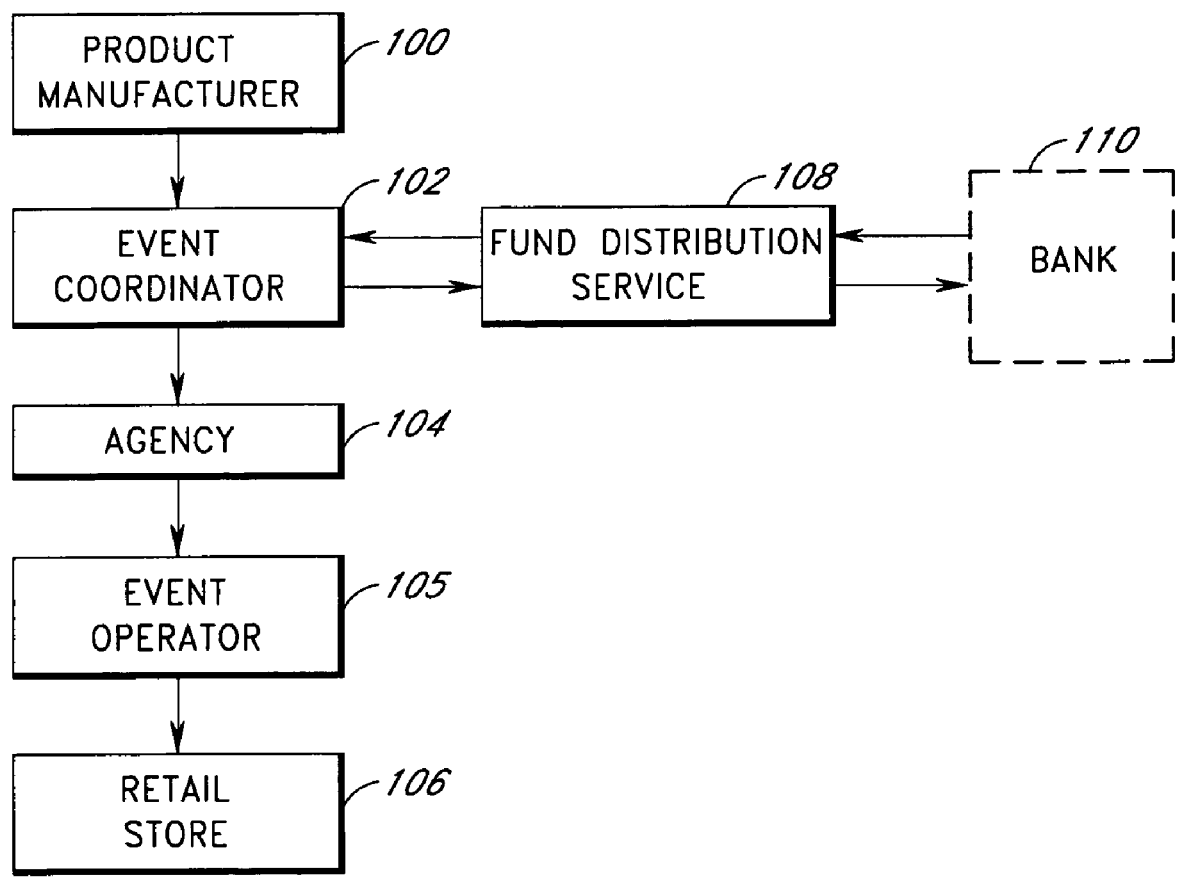
FIG. 1 is a block diagram illustrating the relationships between the entities involved in coordinating product and service demonstrations.

The present invention relates to systems and methods for coordinating and tracking promotional product or service demonstrations. Promotional events in public locations, such as in stores or public parks, are a common way of generating buyer interest in a product or service. For example, a food company may attempt to generate customers for a new product by offering free samples at a table near the location of the product within grocery stores. Depending upon the desires of the food company, the samples may be provided in a few stores in selected cities, or in thousands of stores nationwide.

In certain embodiments of the invention, a method of coordinating product or service demonstrations includes receiving a request from a vendor to organize a demonstration event, defining the demonstration event in a card administration system, providing cards or event cards to event operators, instructing the event operators to activate the cards by contacting the card administration system, instructing the event operators to use the activated cards to purchase items for conducting the event, and instructing the event operators to use the purchased items to conduct the event. A card can be a debit card, a smart card, a credit card, a hybrid debit-credit card that allows a user to spend a percentage of deposited money and use the deposit as security, and the like. The event can be a product demonstration event to display, promote, or distribute products. The event can also be a service demonstration event to introduce or promote services. Examples of services may include travel agency services, financial services, and other services. A vendor is typically an entity that provides the demonstrated products or services.

In addition, or in other embodiments, a method of conducting a product or service demonstration event includes receiving an instruction for conducting a demonstration event, receiving a card, activating the card by contacting a card administration system, using the card to purchase items for conducting the demonstration event, and using the purchased items to conduct the demonstration event.

In certain embodiments, a method of facilitating a product or service demonstration event includes receiving instructions from an event coordinator to conduct the demonstration event, receiving cards from the event coordinator, assigning the cards to event operators, directing the event operators to activate the assigned cards by contacting a card administration system, directing the event operators to use the activated cards to purchase items for conducting the demonstration event, directing the event operators to use the purchased items to conduct the demonstration event, and compensating the event operators for conducting the demonstration event.

In certain embodiments, a method of providing cards for conducting product or service demonstrations includes issuing cards and creating records for the issued cards. The created card records include a card identifier of the card and a balance of the card. The method further includes creating records for demonstration events. The created event records include an event identifier of the event and an authorized budget of the event. The method further includes receiving activation requests, wherein each of the activation requests provides at least a card identifier of a requesting card and an event identifier of a requesting event. The method further includes incrementing the balance of the requesting card by the authorized budget of the requesting event and authorizing a retail request to use one of the cards to purchase items, if the total purchase amount does not exceed the balance of the card.

As discussed above, an event coordinator usually relies on the trustworthiness of agencies hired to staff promotional events. Further, the event coordinator and/or the agencies usually rely on event operators to participate in specified promotional events at specified locations, for specified lengths of time, on specified dates. Due to the large number of promotional events that occur on any particular day, it can be difficult to determine whether a particular promotional event actually occurred and whether it was carried out as requested by a product manufacturer or service provider that ordered the promotional event.

Thus, according to certain embodiments of the invention, systems and methods are provided for tracking promotional events and providing tracked event data to the parties involved in promotional events. In certain such embodiments, at least a portion of the event data is received from event cards provided to event operators and includes, for example, a start time for a particular event and an end time for the particular event.

In certain embodiments, a computerized promotional event coordination and tracking system includes a plurality of graphical user interfaces accessible over a network. The graphical user interfaces may include, for example, HTML web pages or the like. The graphical user interfaces may provide access to the system, or portions thereof, to an event coordinator, an agency, a product manufacturer, a service provider, a retail store manager or employee, an event operator, or combinations of the foregoing. For example, a manufacturer can access a website to order one or more promotional events and to track the progress of the promotional events as event data becomes available to an event coordinator. The manufacturer may be able to view, for example, how many of the requested promotional events have been completed and how much of the demonstrated product was distributed as samples and/or sold during the promotional events.

As another example, an agency and/or event operator can access a website to receive notifications of assigned events, view alerts or changes to assigned events, access instructions for executing the assigned events, view purchases made using event cards, view feedback for the assigned events, view start times and end times for particular assigned events, and view payment information for the assigned events. The payment information may indicate whether previous events have been invoiced and may include, for example, a compensation rate for participation in assigned events and changes to the compensation rate based at least in part on the event data available through the website. For example, an event operator may be paid less if the length of a particular event (as determined by the event operator's recorded start time and end time) is less than that requested in the event instructions.

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present disclosure. The present disclosure, however, may be practiced without the specific details or with certain alternative equivalent components and methods to those described herein. In other instances, well-known components and methods have not been described in detail so as not to unnecessarily obscure aspects of the present disclosure.

FIG. 1 is a block diagram that illustrates the relationships between entities involved in coordinating product and service demonstrations. The entities include a product manufacturer 100, an event coordinator 102, an agency 104, an event operator 105, a retail store 106, a fund distribution service 108, and a bank 110. The product manufacturer 100 can also be a service vendor that provides services. A service vendor can be, for example, a travel agency, a transportation company, a financial brokerage firm, a real estate agency, an Internet service provider, and the like.

Optionally, the bank 110 can include a collection of banks and/or other financial institutions (e.g., a credit card service that issues debits cards). Optionally, the product manufacturer 100, the event coordinator 102, the agency 104, the event operator 105, the fund distribution service 108, and the bank 110, can exist as one entity or a plurality of entities. For example, employees of the product manufacturer 100 can provide the services of the event coordinator 102, the agency 104 and the event operators 105. For another example, the event coordinator 102 can include the fund distribution service 108 and the bank 110 as its own internal financial service facilities.

In one embodiment, the product manufacturer 100 contacts the event coordinator 102 to request a demonstration of a particular product. A service vendor can also contact the event coordinator 102 to request a demonstration of a particular service. The event coordinator 102 directs its own employees or employees from the agency 104 to work as event operators 105 at the retail store 106. In particular, the event operators 105 are directed by the event coordinator 102 or the agency 104 to demonstrate a given product at a given demonstration location on a given date. The event coordinator 102 orders a supply of cards 702 (see FIG. 7) from the fund distribution service 108 to be used by the event operators 105 for purchasing the items necessary for the demonstration. In one embodiment, the event coordinator 102 provides funds to the bank 110 to be held in trust for the fund distribution service 108. The funds cover the total authorized budget for the demonstration events. For an event operator 105 using a given card 702, the authorized budget is the amount sufficient for purchasing one or more of the items to be demonstrated. The authorized budget is also sufficient for purchasing ancillary items in order to conduct the demonstration. For example, the authorized budget for demonstrating a food product may include funds to purchase the food product and funds to purchase paper plates, forks, and the like, for demonstrating the food product. In another example, the authorized budget for the demonstration of a travel agency service includes the funds to purchase items such as pens and paper to prepare for visual presentation of the service to customers of the retail store. The budget may also include funds to purchase other items such as food and souvenirs to be given to customers of the retail store.

In another embodiment, the fund distribution service 108 later bills the event coordinator 102 for the amount purchased on the cards 702. The cards 702 assist the event coordinator 102 or the agency 104 in verifying that the event operators 105 made the specified purchases for the demonstration. The cards 702 also help verify that the event operators 105 conducted the events at the date, time and location specified by the event coordinator 102 or the agency 104.

The fund distribution service 108 provides the event coordinator 102 with cards 702 that include respective card ID information. In one embodiment, each card 702 is also associated with a respective PIN number that identifies the card 702. In other embodiments, a group of cards 702 is associated with a respective PIN number that identifies the group of cards 702. Companies such as GE Capital, American Express, or Comdata Corporation can be used as the fund distribution service 108. The event coordinator 102 can also create its own fund distribution service 108. The card 702 can be a debit card, a credit card, a smart card, or another type of computer accessible storage medium. A credit card typically stores information on a magnetic strip of the credit card. A smart card typically stores information in a microchip of the smart card. Information can also be stored on other computer accessible storage medium such as floppy disks or optical disks. For convenience, all of the various embodiments are referred to in the present application as cards or event cards 702.

In one embodiment described below, the event coordinator 102, the fund distribution service 108, or both entities can use a card administration system to automate the card administration process. The fund distribution service 108 provides the cards 702 to the event coordinator 102, the agency 104, or the event operator 105. A balance is associated with each individual card 702. The card 702 can be deactivated after the demonstration is completed.

In one embodiment, the event coordinator 102 uses the card administration system to maintain records for the cards 702 and records for the demonstration events. The event coordinator 102 typically assigns multiple cards 702 to each agency 104. The event coordinator 102 can also change the PIN numbers of the cards 702 assigned to the agency 104. In one embodiment, some or all of the cards 702 assigned to an agency 104 share the same PIN number, therefore reducing the number of PIN numbers that the agency 104 needs to maintain.

Prior to starting the demonstration, the event operator 10S activates the card 702 he or she will be using by contacting a card administration system. The event operator 105 contacts the card administration system using an automated device through a communication medium such as a telephone line or a computer network. The automated device can be a Voice Recognition Unit (VRU) that accepts input by voice recognition, or a device that accepts input from the keypad of a telephone (including a cellular phone), from the keyboard of a computer or personal digital assistant, or from other wired or wireless electronic devices. The event operator 105 provides the automated device with a card ID and an event ID. After receiving the card ID and the event ID, the card administration system authorizes the card 702 with the provided card ID to be used for the event with the provided event ID. The card administration system associates the card 702 with the event's authorized budget. In another embodiment, the event coordinator 102 or the agency 104 contacts the card administration system directly or through the automated device to activate the cards 702 that will be used by event operators 105. The card administration system can be administered by the event coordinator 102, the fund distribution service 108, or a third party.

The event operator 105 uses the authorized card 702 to purchase items at the retail store 106. The card ID and the PIN number are forwarded from the retail store 106 to the fund distribution service 108. The fund distribution service 108 verifies that the forwarded card ID and the PIN number matches the card ID and the PIN number stored at the fund distribution service 108, authorizes the retail store 106 purchase, reduces the card's 702 balance by the purchase amount, and optionally deducts the purchase amount from the event coordinator's funds in bank 110. In one embodiment, the fund distribution service 108 also verifies that the event associated with the card 702 represents an event that is still open.

Figure 2:
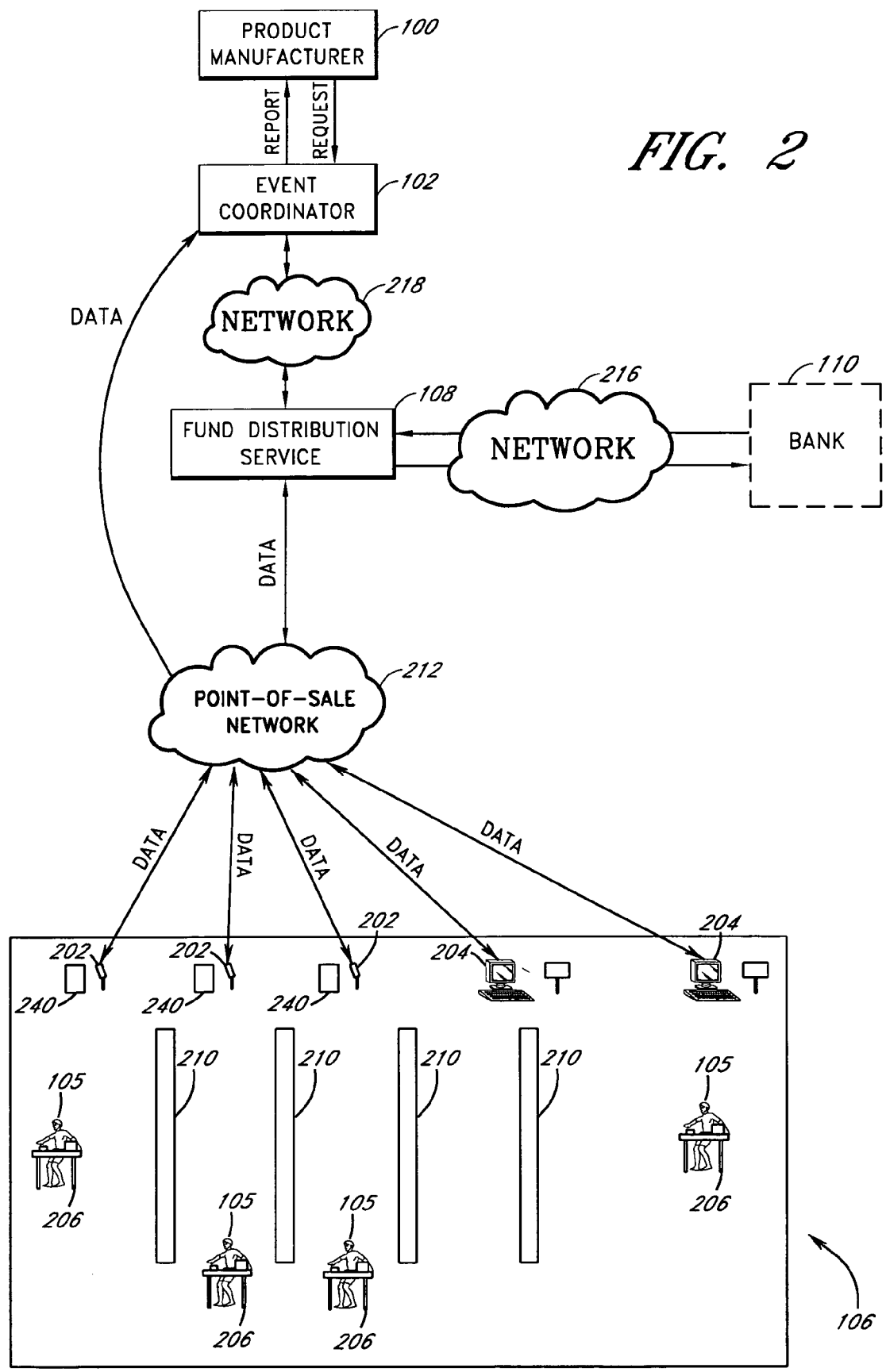
FIG. 2 is a block diagram of the functional elements of the system for coordinating product and service demonstrations.

FIG. 2 is a block diagram of the functional elements of the system for coordinating product and service demonstrations. The retail store 106 includes a plurality of event operators 105 shown at a plurality of demonstrations 206, a plurality of cash registers 240, a plurality of card reading devices 202, a plurality of time recording devices 204, and a plurality of aisles 210. The card reading devices 202 and the cash registers 240 are preferably located in close proximity at checkout lanes of the retail store 106. Each of the event operators 105 may be any individual or group of individuals that assist with the demonstration of a good or service.

The product manufacturer 100 issues a request to the event coordinator 102 to conduct a product demonstration event. The event coordinator 102 requests and receives cards 702 from the fund distribution service 108 to be used to purchase items for conducting the event. The event coordinator 102 also identifies to the fund distribution service 108 an account at a bank 110 from which the event coordinator's funds will be used to support the purchases. The cards 702 are assigned to the event operators 105 to be used as described below.

When an event operator 105 enters the retail store 106, the event operator 105 swipes or inserts a card 702 at the time recording device 204 to record his or her work starting time. The time recording device 204 records the time and sends the time entry data and the card ID to the point-of-sale network 212. Optionally, the time recording device 204 can be a kiosk, wireless device, PDA, cellular phone, or any other device capable of recording time entries. In one embodiment, the card reading device 202 also functions as a time recording device 204 to record time entries. The point-of-sale network 212 is preferably a Public Switched Telephone Network (PSTN). One skilled in the art will recognize that the point-of-sale network 212 can also be the Internet, a cable television (CATV) network, a satellite network, or any other communications network. When the event operator 105 has completed the demonstration and is ready to exit the retail store 106, he or she swipes or inserts the card 702 at the time recording device 204 to record his or her work ending time. The point-of-sale network 212 sends the time entry data to the event coordinator 102. Optionally, the identity or location of the retail store 106 is also sent to the event coordinator 102, so that the event coordinator 102 can verify that the event operator 105 went to the specified retail store 106. The point-of-sale network 212 sends data to the event coordinator 102 through the fund distribution service 108 and the network 218. The network 218 is preferably a Public Switched Telephone Network (PSTN). One skilled in the art will recognize that the network 218 can also be the Internet, a cable television (CATV) network, a satellite network, or any other communications network. In another embodiment, the point-of-sale network 212 sends data directly to the event coordinator 102.

After recording his or her work starting time, the event operator 105 then purchases the items needed for the product or service demonstration by searching through the aisles 210 of the retail store 106. The event operator 105 takes the items to the cash register 240 and purchases the items by swiping or inserting the card 702 at the card reading device 202. In one embodiment in which the card reading device 202 can function as a time recording device 204, the event operator 105 records work starting time by swiping or inserting the card 702 at the card reading device 202 at the cash register 240 at the same time as purchasing an item or before the purchase of an item.

In one embodiment, the event operator 105 purchases items at an automated cash register 240, without the help of a store employee. The event operator 105 swipes or inserts the card 702 at the card reading device 202. The automated cash register 240 then authorizes the purchase.

When the event operator 105 purchases the items by swiping or inserting the card 702, data received by the card reading device 202 is sent from the point-of-sale network 212 to the fund distribution service 108, which determines if the purchase amount falls within the balance of the card 702. If the purchase amount falls within the balance, the purchase is authorized and the purchase amount is deducted from the balance on the card 702. In one embodiment, the identities of the items to be purchased are also sent to the fund distribution service 108. The identity of an item can include an item identifier such as an UPC (Uniform Product Code) code, or an item name. The identities of the items are compared against a list of authorized items for the event associated with the card 702, to ensure that the event operator 105 purchased the authorized items, instead of other items for personal use. In one embodiment, the identities of authorized items are stored on the card 702. A smart card is preferably used to store the identities of authorized items. Other information, such as the location or identity of the retail store 106, can also be sent to the fund distribution service 108 to ensure that the event operator 105 is at the correct location. After the event operator 105 completes the purchase, the event operator 105 conducts the demonstration 206 using the purchase items. If the purchase amount exceeds the balance, the purchase will be rejected.

The point-of-sale network 212 sends the time entry data and the purchase data of the event operators 105 from the retail store 106 to the fund distribution service 108. The fund distribution service 108 then uses the network 216 to issue a request to the bank 110 to transfer the purchase amounts from the funds of the event coordinator 102 to an account of the retail store 106. In another embodiment, the point-of-sale network 212 directly sends the purchase data of the event operators 105 to the bank 110. The bank 110 optionally verifies that the purchase data received directly from the point-of-sale network 212 matches the purchase data received from the fund distribution service 108. The bank 110 transfers the purchase amounts from the funds of the event coordinator 102 to an account of the retail store 106.

After completing the demonstration, the event operator 105 proceeds to the time recording device 204 and swipes or inserts the card 702 to record his or her work ending time. The total working time of the event operator 105 is determined by deducting the recorded ending time from the recorded starting time. The recorded work starting time, the recorded work ending time and the total working time are sent from the point-of-sale network 212 to the fund distribution service 108. The fund distribution service 108 sends the time entry data and the purchase data to the event coordinator 102. In another embodiment, the time entry data and the purchase data are sent directly from the point-of-sale network 212 to the event coordinator 102. In certain embodiments, the event coordinator 102 receives the recorded work starting time and the recorded work ending time from the point-of-sale network 212 and calculates the total working time of the event operator 105.

The event coordinator 102 uses the received data to evaluate the work performance of event operators 105. Based on the evaluation, the event coordinator provides further instructions to the agency 104 or to the event operators 105. The event coordinator 102 uses the purchase data to determine if the event operators 105 are making the proper purchases. The event coordinator 102 sends a report of demonstration performance to the product manufacturer 100. The event coordinator 102 can also send the time entry data and the purchase data to the product manufacturer 100. The event coordinator 102 uses the time entry data and the purchase data, the report, and feedback from the product manufacturer 100 to adjust future work assignments. For example, the event coordinator 102 may decide to use more event operators 105 in a certain area or on a certain product. In certain embodiments, the event coordinator 102 also uses the time entry data and the purchase data, the report, and feedback from the product manufacturer 100 to determine the amount of compensation to be paid to the agency 104 and/or the event operators 105. For example, the amount of compensation can be adjusted based on the time duration of demonstrations, the number of demonstrations conducted on a certain date, the number of demonstrations conducted on a certain product, the number of demonstrations conducted at a certain location, and so forth.

In one embodiment, the card 702 employs smart card technology. The card 702 includes an imbedded computer chip, and the card reading device 202 is a smart card reader. The event ID, the card ID, and the PIN number can be stored on the card 702. In addition, the authorized budget and the authorized items for the event can be stored on the card 702. Multiple event IDs for multiple events, the respective authorized budgets for the events, and the respective authorized items for the events, can also be stored on the card 702. By entering an event ID at the card reading device 202, the event operator 105 can select an event to be associated with the card 702. In another embodiment, the event operator 105 contacts a card administration system and selects an event to be associated with the card 702.

Figure 3:
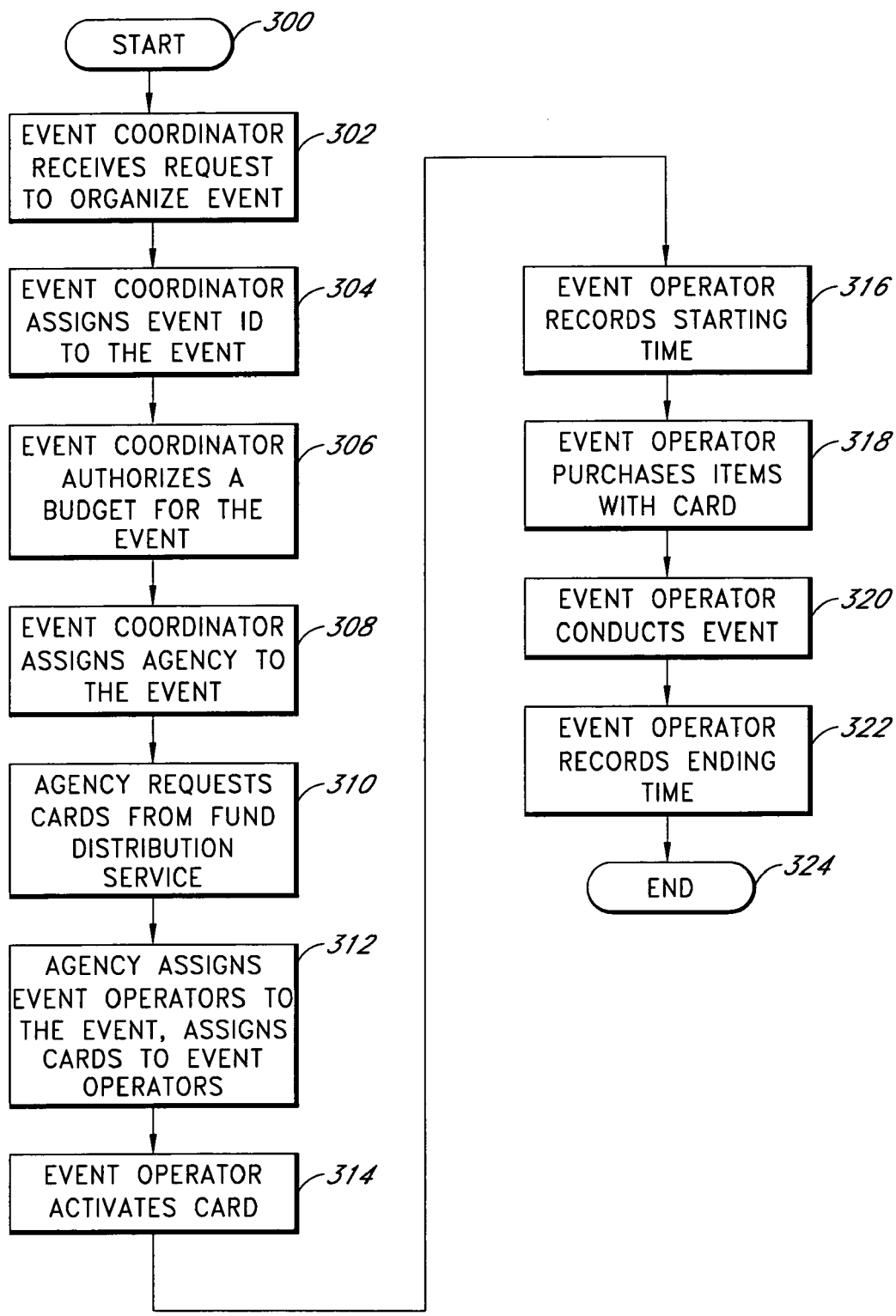
FIG. 3 is a flow chart illustrating one embodiment of a process of distributing cards to event operators and conducting demonstrations.

FIG. 3 is a flow chart illustrating one embodiment of a process for distributing cards 702 to event operators 105 and for conducting demonstrations. The process begins at a block 300. The process advances from the block 300 to a block 302, where the event coordinator 102 receives a request from the product manufacturer 100 to organize a demonstration event at the retail store 106. The process then advances to a block 304, where the event coordinator 102 assigns an event ID for the given demonstration event. An event can be defined as activities in a single day, or a number of days. An event can be defined as demonstrations on a particular product, or on a number of products. An event can also be defined as demonstrations of a particular service, or a number of services.

The process advances from the block 304 to a block 306, where the event coordinator 102 authorizes a budget for use by each event operator 105 in purchasing items for the demonstration event. The budget is associated with the event ID. The process then advances to a block 308, where the event coordinator 102 assigns an agency 104 or a number of agencies to organize the event. In another embodiment, the event coordinator 102 directly assigns event operators 105 to conduct the event.

The process then advances to a block 310, where the assigned agency 104 requests cards 702 from the fund distribution service 108. In other embodiments, the assigned agency 104 requests cards 702 from the vent coordinator 102.

In one embodiment, the event coordinator 105 requests cards 702 from the fund distribution service 108. In one embodiment, the agency 104 or the event coordinator 102 has retained cards 702 previously provided by the fund distribution service 108, and redistributes the cards 702 to the event operators 105 for the current demonstration event.

The process advances to a block 312, where the agency 104 assigns event operators 105 to the event, and assigns cards 702 to the assigned event operators 105. In one embodiment, the event coordinator 102 assigns cards 702 to the event operators 105 to conduct the event.

The process then advances to a block 314, where an event operator 105 activates the card 702 prior to a demonstration. In one embodiment, the event operator 105 activates the card 702 by entering the event ID into the card reading device 212 at the time of purchase. One embodiment of the activation process is described below in connection with FIG. 4. Optionally, the event operator 105 can activate the card 702 by calling a toll-free phone number or by accessing an activation web site. The process then advances to a block 316, where the event operator 105 swipes or inserts his or her card 702 at a time recording device 204 to record his or her work starting time.

The process then advances to a block 318, where the event operator 105 uses the card 702 to purchase items needed for the demonstration. The process then advances to a block 320 where the event operator 105 performs the demonstration. The term "demonstration" is used broadly in the present application to refer to the display, distribution, promotion, or advertising of products and services. The process then advances to a block 322, where the event operator 105 records his or her work ending time at a time recording device 204. The process then proceeds to an end block 324.

Figure 4:
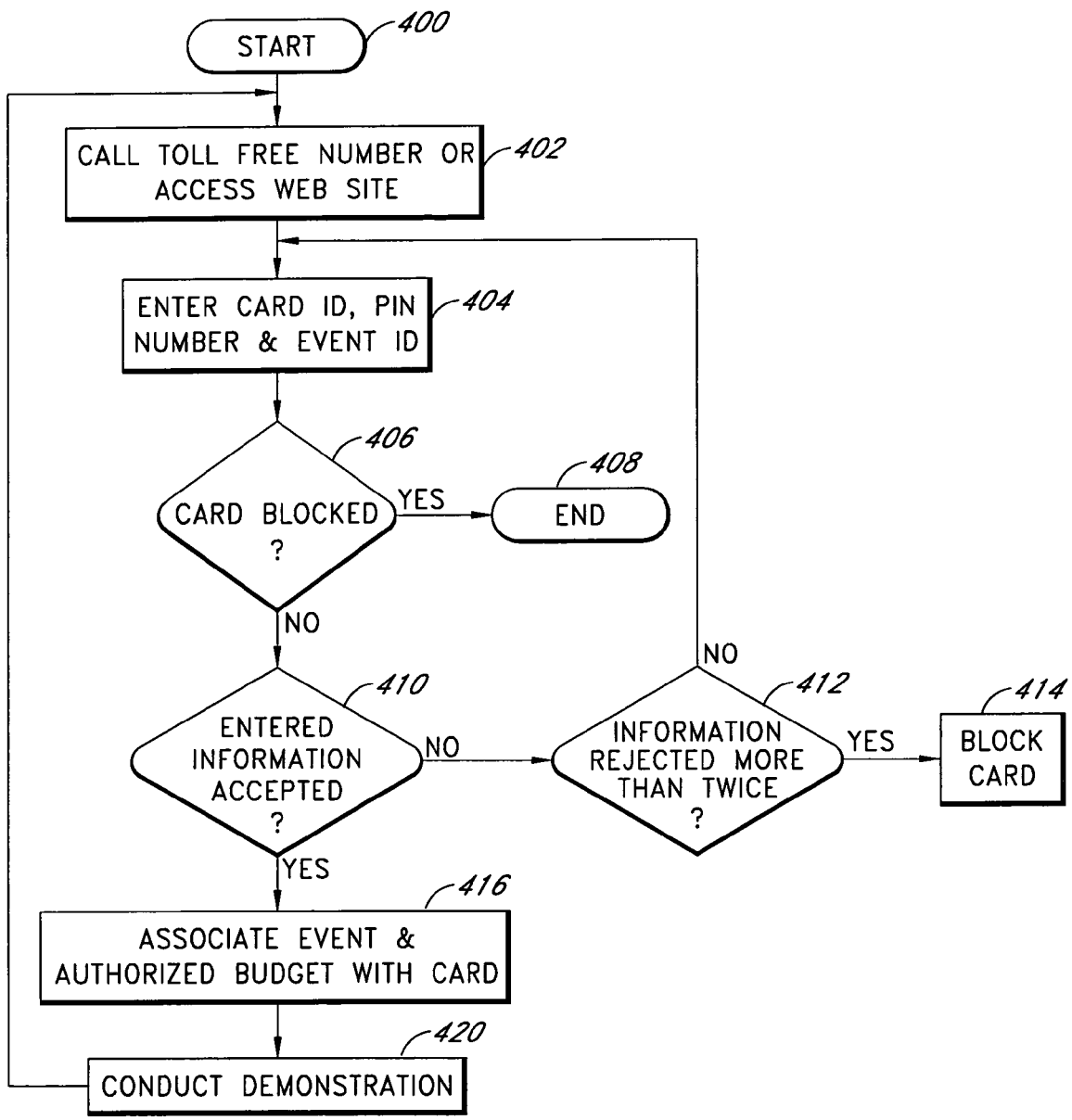
FIG. 4 is a flow chart illustrating one embodiment of the process of an event operator activating a card.

FIG. 4 is a flow chart illustrating one embodiment of the process of an event operator 105 activating a card 702. The process begins at a block 400. The process advances to a block 402, where the event operator 105 contacts a card administration system by calling a phone number, preferably a toll-free number, to activate the card 702. In another embodiment, the event operator 105 contacts the card administration system by accessing an activation web site. The process then advances to a block 404, where the event operator 105 enters information such as the card ID of the card 702, the PIN number of the card 702, and the event ID for the particular demonstration event. In one embodiment, the PIN number is the last four digits of the card ID. In another embodiment in which a card 702 is not associated with a PIN number, the event operator 105 enters the card ID and the event ID. The process advances to a decision block 406, where the card administration system determines whether the card 702 associated with the entered card ID has been blocked. In one embodiment to be described below, the card administration system updates a card's 702 status to "blocked" if a user has attempted unsuccessfully more than twice to activate the card. The card administration system also updates a card's 702 status to "blocked" if the card has been reported stolen, or if the event operator 105 or the agency 104 in possession of the card 702 has been terminated by the event coordinator 102. If the card 702 has been blocked, the process advances to an end block 408, and the event operator 105 cannot use the card 702. To "un-block" a card, a system administrator of the card administration system updates the status of the card. If the card 702 has not been blocked, the process advances to a decision block 410.

At the decision block 410, the information entered in block 404 is either accepted or rejected. The card administration system verifies that the entered card ID, the entered PIN number and the entered event ID are valid. One embodiment of the card administration verification process is described below in connection with FIG. 5. If the information is not valid and is thus rejected, the process advances to a decision block 412 to determine if the information has been rejected more than two times.

At the decision block 412, if the information has not been rejected more than two times, the process returns to the block 404 to allow the event operator 105 to re-enter the card ID, the PIN number, or the event ID. In certain embodiments, at the decision block 412, if the information has been rejected more than two times, there is a presumption that the information was rejected for a reason other than a mistaken entry, and the card is blocked at a block 414. The card administration system updates the card's status to a blocked status, so that the card can no longer be used by an event operator 105. In one embodiment, the number of rejections allowed is a variable that can be modified by the event coordinator 102 or the fund distribution service 108.

If the information is accepted at the decision block 410, the process advances to a block 416, where the card 702 is associated with an authorized budget for an event. The card administration system identifies the authorized budget for the provided event ID, and associates the budget with the card 702. The balance of the card 702 is updated to the amount of the budget. To help the event coordinator 102 track the current use of the card 702, the card administration system also associates the event with the card 702. The process then advances to a block 420, where the event operator 105 uses the card 702 to make purchases and conducts demonstration. The card administration system then deactivates the card 702 at a later time, for example at the end of the last day of the demonstration event or at the end of each day of the demonstration event. In particular embodiments, each event operator 105 is instructed to contact the card administration system after completing his or her demonstration to deactivate the card 702, by providing the card ID, PIN number, and an event ID for the event to be deactivated. The card administration system reduces the balance of the card 702 to zero, thus preventing an event operator 105 from using the card 702 to make purchases for a deactivated event. The process then returns to the block 402 to allow the event operator 105 to activate the card 702 for a subsequent demonstration.

In another embodiment, the event coordinator 102 or the agency 104 provides pre-activated cards 702 to the event operators 105. Each of the cards 702 is already associated an authorized budget and optionally with an event ID. The event coordinator 102 or the agency 104 activates the cards 702 by contacting the card administration system using the process of FIG. 4, or by updating the card records in the card administration system using a system administrator's program. Therefore the event operators 105 do not need to activate the cards 702.

In one embodiment, the card administration system is administered by the event coordinator 102. Data on activated cards 702, including the card ID, the PIN number, and the card balance are sent to the fund distribution service 108, which uses the data to authorize or reject event operator 105 purchases.

Figure 5:
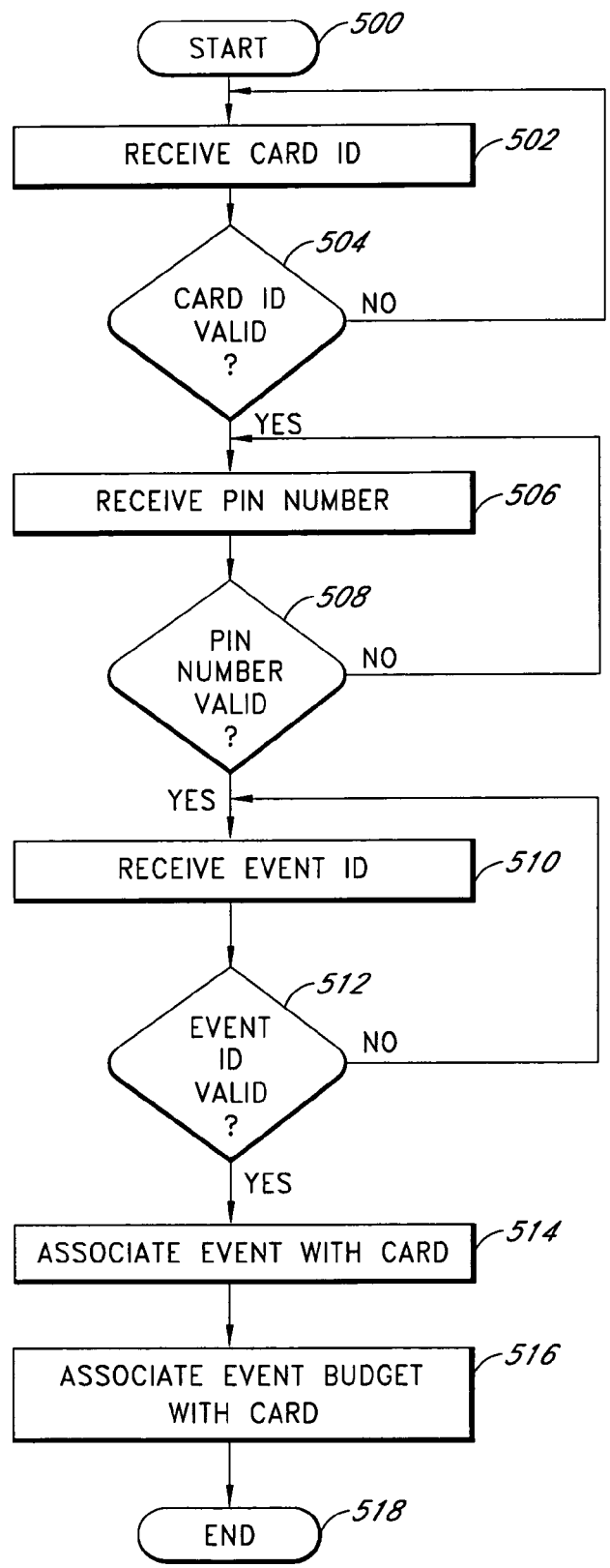
FIG. 5 is a flowchart illustrating one embodiment of the process of a card administration system activating a card.

FIG. 5 is a flowchart illustrating one embodiment of the process of a card administration system activating a card 702. The card administration system stores records for events, including the respective event ID, authorized budget, and status for each event. The card administration system also stores records for cards 702, including the respective card ID, the PIN number, the status, the associated event ID, and the balance for each card. In one embodiment, a card record also includes an identifier of the agency 104 to which the card 702 is assigned, or an identifier of the event operator 105 to which the card 702 is assigned.

The process starts from a start block 500, and advances to a block 502. At the block 502, the card administration system receives a card ID provided by an event operator 105. The process advances to a decision block 504, where the card administration system verifies that the provided card ID is valid. The card administration system verifies that the card ID is associated with an existing card 702, and that the card 702 is not blocked or already activated. If the card ID is not valid, the process returns to the block 502 to prompt the event operator 105 to re-enter the card ID. If the card ID is valid, then the process advances to a block 506.

At the block 506, the card administration system receives a PIN number from the event operator 105. The process advances to a decision block 508, where the card administration system verifies that the provided PIN number is valid. The card administration system verifies that the PIN number is associated with the card 702. If the PIN number is not valid, the process returns to the block 506 to prompt the event operator 105 to re-enter the PIN number. If the PIN number is valid, then the process advances to a block 510. In one embodiment, a card 702 is not associated with a PIN number, and the actions of the block 506 and the block 508 are omitted.

At the block 510, the card administration system receives an event ID from the event operator 105. The process advances to a decision block 512, where the card administration system verifies that the provided event ID is valid. The card administration system verifies that the event ID is associated with an existing event that is still open. The card administration system maintains the events and the respective "open" or "closed" status for each event. If the event coordinator 102 does not want to have demonstrations conducted for an event, the event coordinator 102 directs the event status to be defined as "closed" or "pre-cancelled." In one embodiment, the card administration system maintains a starting date and an ending date of each event. If the ending date for an event has expired, the event is automatically defined as a closed event, so that event operators 105 cannot use cards 702 for an event that has passed its scheduled ending date. An event having a starting date more than approximately one or two days later than the current date is also defined as a closed event, so that event operators 105 can use cards 702 only for events scheduled to start on the current day or the next day or two, but cannot use cards 702 for events scheduled to start on a later future date.

If the event ID is not valid, the process returns from the decision block 512 to the block 510 to prompt the event operator 105 to enter a valid event ID. If the event ID is valid, the process advances to a block 514. At the block 514, the card administration system associates the event ID with the card 702. The process advances to a block 516, where the card administration system associates the authorized budget of the event with the card 702. The balance of the card 702 is replaced or updated to be the amount of the authorized budget of the event. In another embodiment, the card administration system increases the balance of the card 702 by the amount of the authorized budget of the event. The process then advances to an end block 518.

In one embodiment, each demonstration event is defined as an event starting and ending on a particular day. At the end of the day, the card administration system assigns an event status of "closed" to all events of the current day, and deactivates all cards 702 associated with such events. The balance of a deactivated card 702 is reduced to zero.

Figure 6:
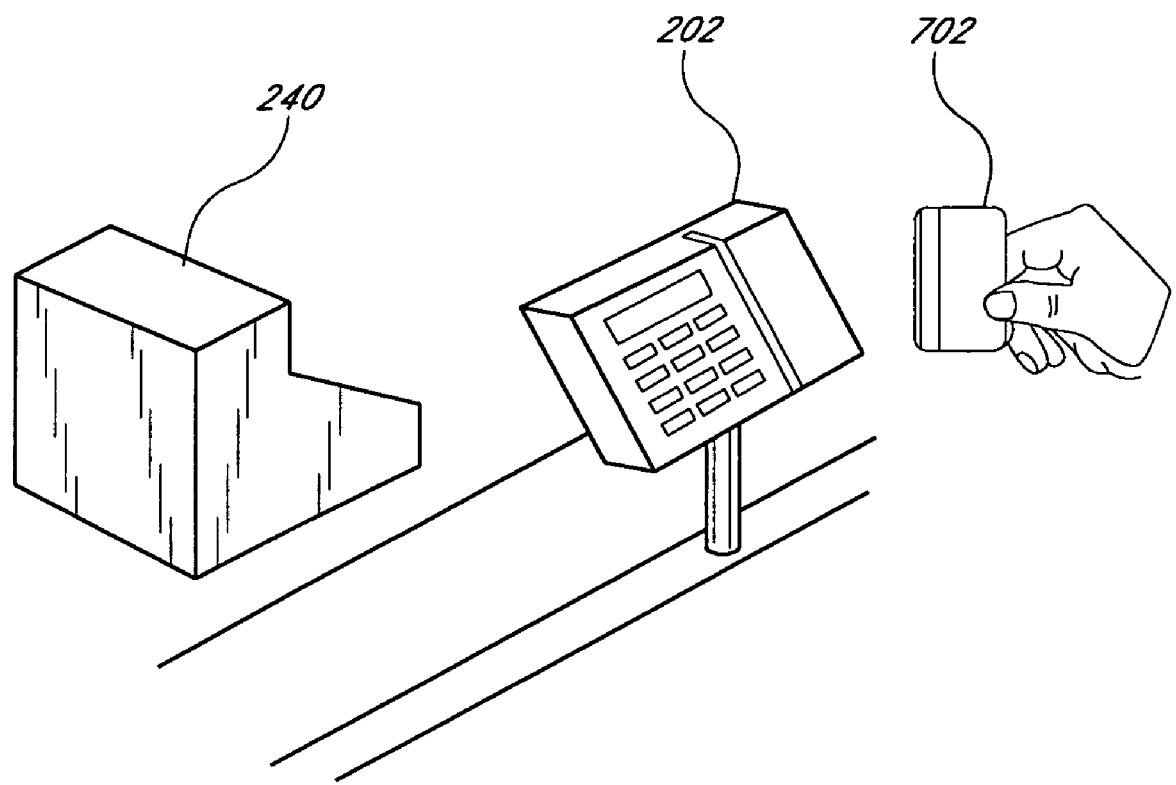
FIG. 6 is a diagram illustrating one embodiment of a card reading device and a cash register.

FIG. 6 illustrates one embodiment of the card reading device 202 placed near the cash register 240 within the retail store 106. The configuration allows for the event operator 105 to use the card 702 by swiping or inserting it at the card reading device 202. One embodiment of the card reading device 202 is Master Card's Maestro card reading device.

Figure 7:
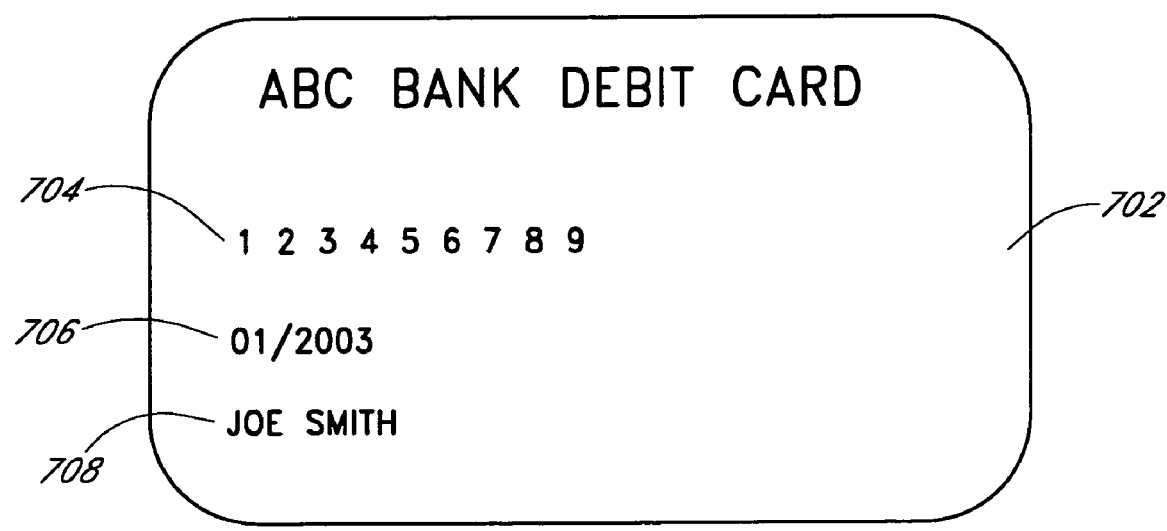
FIG. 7 illustrates one embodiment of a card.
Figure 7:
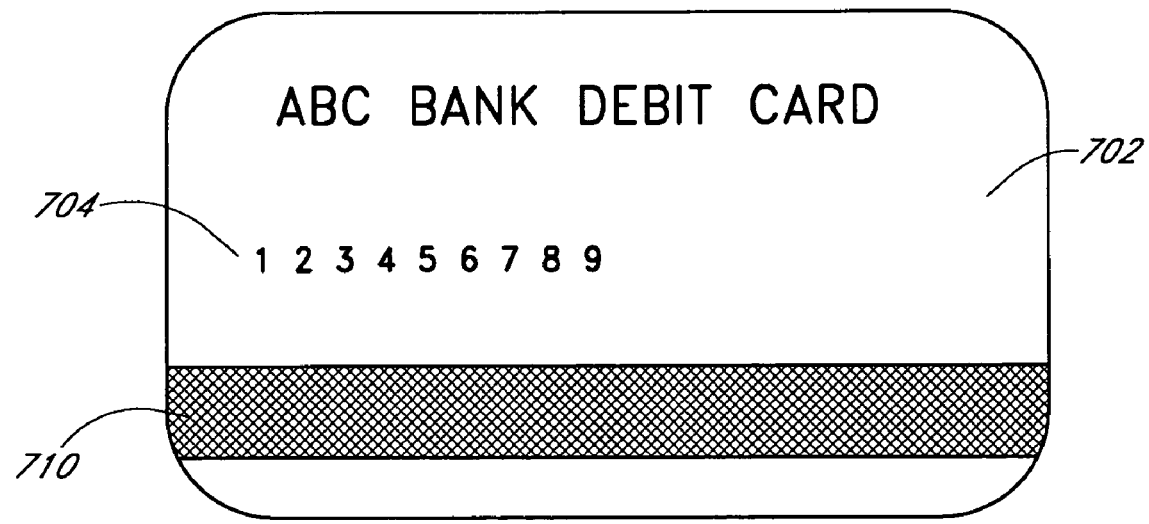

FIG. 7 illustrates one embodiment of a card 702. The top portion of FIG. 7 illustrates the front of a debit card issued by "ABC BANK." The bottom portion of FIG. 7 illustrates the back of the debit card. The card 702 as shown in FIG. 7 includes a card number 704, an expiration date 706, and a customer name 708. The customer name 708 is typically the name of the event coordinator 102, but can also be the name of the agency 104 or the name of an event operator 105. The card 702 also includes a magnetic strip 710, which stores card information such as the card number 704. In another embodiment, the card 702 does not include a customer name 708.

Figure 8:
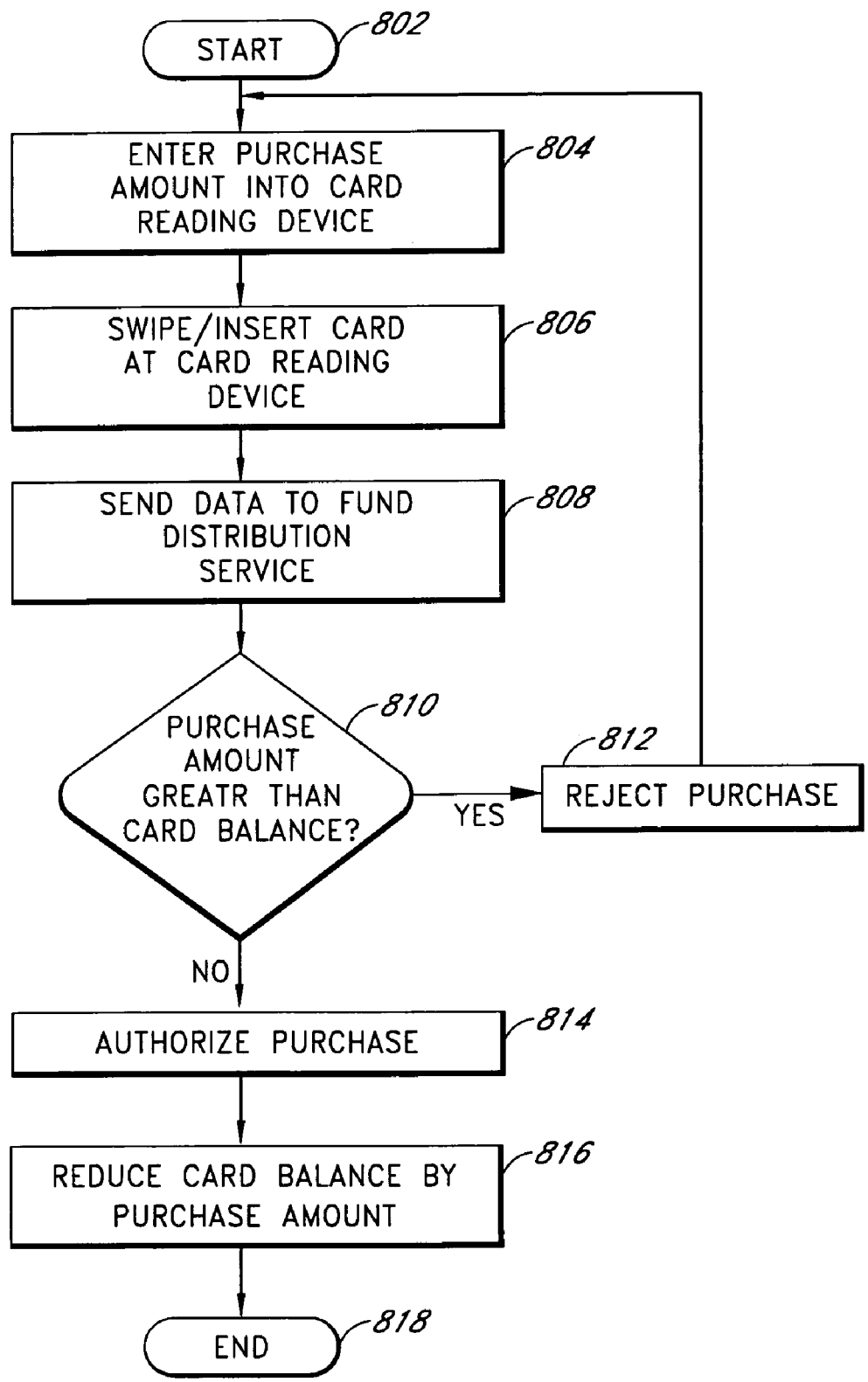
FIG. 8 illustrates one embodiment of a card purchase authorization process.

FIG. 8 illustrates one embodiment of a card purchase authorization process. The process starts from a block 802 and advances to a block 804. At the block 804, the event operator 105 or a retail store 106 employee enters the total purchase amount for the items to be purchased into a card reading device 202. In one embodiment, the event operator 105 or a retail store 106 employee scans the total purchase amount into the card reading device 202. The process advances to a block 806, where the event operator 105 or the retail store 106 employee swipes or inserts the card 702 at the card reading device 202. In one embodiment, the event operator 105 further enters a card PIN number into the card reading device 202. The process advances to a block 808, where the card reading device 202 sends data through the point-of-sale network 212 to the fund distribution service 108. The sent data includes the total purchase amount, the card ID of the card 702, and optionally other information, such as the identifications of the items to be purchased, the current date and time, and the identification of the retail store 106. In one embodiment, the card reading device 202 sends data to a card administration system maintained by the fund distribution service 108, by the event coordinator 102, or jointly by the fund distribution service 108 and the event coordinator 102. In another embodiment, a card information database at the fund distribution service 108 is connected to a card administration system of the event coordinator 102. When an event operator 105 contacts the card administration system and activates a card 702, the card administration system updates the card balance in the card administration system, and notifies the fund distribution service's card information database to update the card balance.

The process advances from the block 808 to a decision block 810, where a determination is made as to whether the requested purchase amount is greater than the card balance. If the purchase amount is greater than the card balance, the process advances to a block 812, where the authorization request is rejected. The process then returns from the block 812 to the block 804, where the event operator 105 or the retail store 106 employee can enter another purchase amount. If the purchase amount is less than or equal to the card balance, then the process advances from the decision block 810 to a block 814, where the purchase is authorized. The event operator 105 is thus allowed to purchase the items for conducting a demonstration event. The process advances to a block 816, where the card balance is reduced by the purchase amount. In one embodiment in which the fund distribution service's card information database is connected to the event coordinator's card administration system, the fund distribution service reduces the card balance in the card information database, and notifies the card administration system to reduce the card balance in the card administration system. The process then advances to an end block 818.

FIG. 9 illustrates one embodiment of a computer screen for maintaining event records in a card administration system. An event records table 902 in FIG. 9 displays event records stored in the card administration system. Each event record includes an event ID 904 that identifies the event, an event status 906 of "open" or "closed," an event starting date 908, an event ending date 910, an authorized budget 912 of the event, an agency ID 914 identifying the agency (or agencies) responsible for the event, and card numbers 916 identifying cards that are associated with the event. Event operator identifiers (not shown) can also be associated with an event record, to identify event operators 105 who are responsible for conducting the event. The event operator identifiers can be entered by the event operators 105 when they contact the card administration system to activate the cards 702.

The event records are preferably maintained by the event coordinator 102. The event coordinator 102 creates and updates the event records. The event coordinator 102 assigns an authorized budget 912 to each event. The event coordinator 102 also assigns one or more agencies 104 identified by the agency ID field 914 to conduct the event. The event status 906 can be maintained by a system administrator of the event coordinator 102, or maintained automatically depending on the event starting date 908 and the event ending date 910. For example, an event whose event ending date 910 has expired (i.e., is earlier than the current date) is assigned an event status 906 of "closed." An event whose event starting date 908 has not arrived (i.e., is much later than the current date) is also assigned an event status 906 of "closed."

The event records can be maintained in a spreadsheet, a flat file database, a relational database, an object-oriented database, or a combination of the above. An event record can be maintained in separate tables. For example, the event ID 904 and the authorized budget 912 can be maintained in an event-budget table, and other event information shown in table 902 except the authorized budget 912 can be maintained in a separate table. For another example, instead of being stored in the event records table 902, the card numbers 916 can be stored in a card records table 1002 (see FIG. 10). As described below, the card administration system can use the event ID 1014 in the card records table 1004 to identify the card IDs associated with each event. The event ID 1014 of a card record stores the event ID associated with the card 702. The card numbers 916 are then displayed in the event records table 902.

FIG. 10 illustrates one embodiment of a computer screen for maintaining card records in a card administration system. A card records table 1002 in FIG. 10 displays card records stored in the card administration system. Each card record includes a card ID 1004, a PIN number 1006, a card status 1008 of "activated," "deactivated," or "blocked," a balance amount 1010, an agency ID 1012 identifying the agency to which the card 702 is assigned, and an event ID 1014 identifying the event associated with the card 702. A card record can also include an event operator identifier (not shown) that identifies the event operator 105 to whom the card 702 is assigned. The event operator identifiers can be entered by the event operators 105 when they contact the card administration system to activate the cards 702.

The card ID 1004 of a card 702 is typically issued by the fund distribution service 108. The event coordinator 102 assigns cards 702 to agencies 104, and updates the agency ID field 1012. The event coordinator 102 or the fund distribution service 108 can optionally update the PIN number 1006 of a card 702. In one embodiment, each agency 104 is assigned one or more fixed PIN numbers, to help the agency 104 and its event operators 105 to remember the PIN numbers. The event ID 1014 identifies the event associated with the card 702. The event ID 1014 is entered by an event operator 105 during the card activation process of FIG. 4. The balance amount 1010 is zero for deactivated or blocked cards 702. For cards 702 that have been activated but have not been used for purchases, the balance amount 1010 is equal to the authorized budget of the associated event. The balance amount 1010 of an activated card 702 is then reduced by the amount of purchase made by the event operator 105.

The card records can be maintained in a spreadsheet, a flat file database, a relational database, an object-oriented database, or a combination of the above. A card record can be maintained in separate tables. Other tables can also be used. For example, an agency records table (not shown) can be used to keep track of the cards 702 and the events assigned to each agency 104. The agency record table includes the agency ID, the card numbers for cards assigned to the agency 104, the event IDs for events assigned to the agency, and the PIN numbers assigned to the agency 104.

Additional information can also be displayed in computer-generated reports or computer screens. For example, for each card 702, a report or screen can display the item identifiers for the items purchased using the card 702. Other purchase information can also be displayed, for example the item names for the purchased items, the price and quantity of the purchase items, the date and time of the purchase, the recorded work starting time, the work ending time, and the identity or location of the retail store 106. Computer-generated reports or computer screens can be used for many purposes, such as tracking the progress of a card 702, tracking the progress of an event, tracking the progress of an agency 104, and the like.

Figure 11:
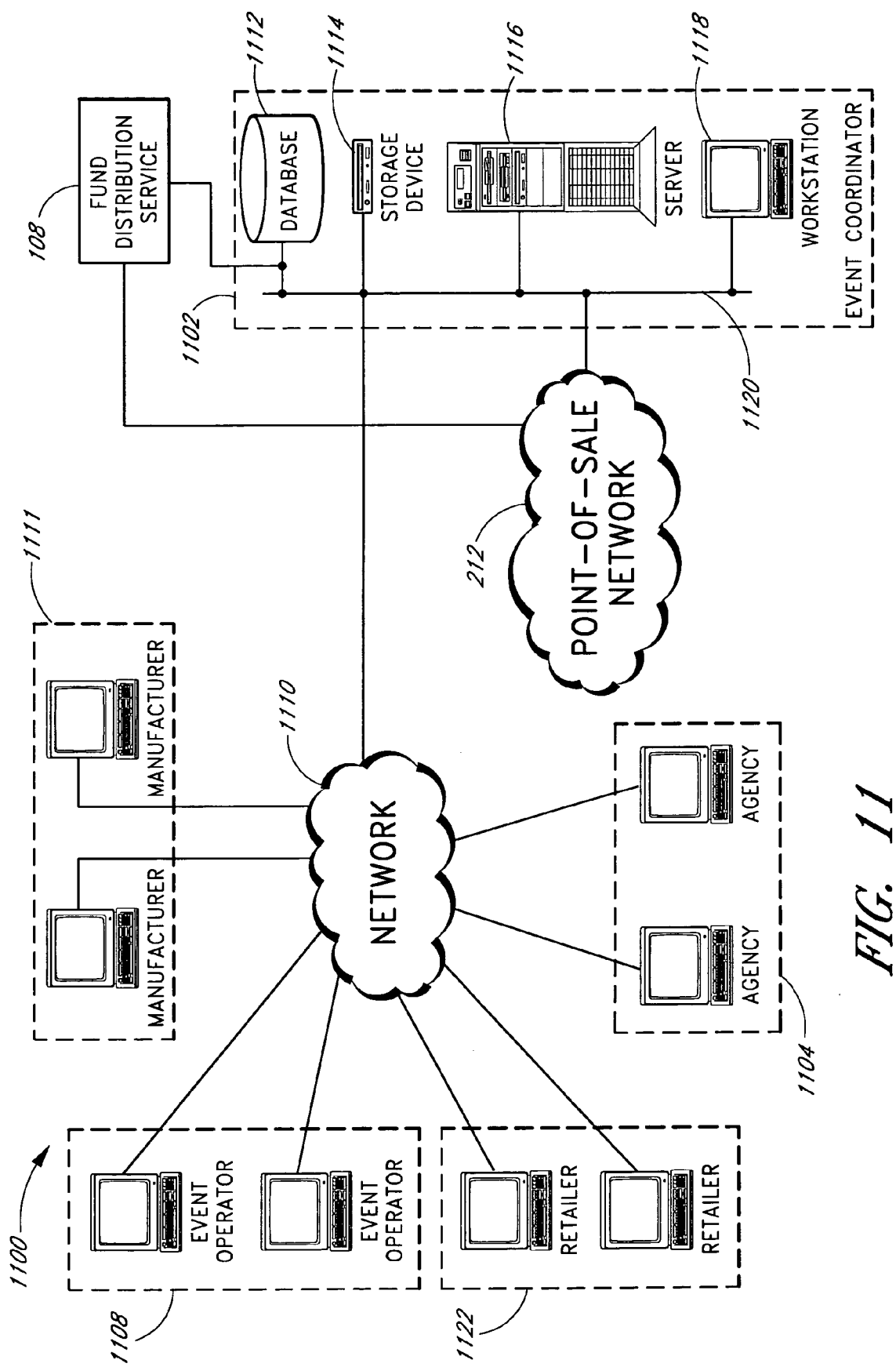
FIG. 11 is a block diagram of a system for coordinating and tracking demonstration events.

FIG. 11 is a block diagram of a system 1100 according to certain embodiments of the invention for coordinating and tracking demonstration events. The system 1100 is configured to process and transfer information between the entities involved in a demonstration event and includes an event coordinator system 1102, agency systems 1104 (two shown), event operator systems 1108 (two shown), retailer systems 1122 (two shown), and manufacturer systems 1111 (two shown) connected through a network 1110. The network 1110 can include, for example, a local area network (LAN), a wide area network (WAN), a Public Switched Telephone Network (PSTN), a cable television (CATV) network, the Internet, or other connection services and network variations such as the world wide web, the public internet, a private internet, a private computer network, a secure internet, a private network, a public network, a value-added network, combinations of the foregoing, or the like.

The event coordinator system 1102, agency systems 1104, event operator systems 1108, retailer systems 1122, and manufacturer systems 1111 can include, for example, computers comprising any microprocessor controlled device that permits access to the network 1110, including terminal devices, such as personal computers, workstations, servers, mini-computers, hand-held computers, main-frame computers, laptop computers, mobile computers, set top boxes for televisions, combinations thereof, or the like. The computers may further include input devices such as a keyboard or a mouse, and output devices such as a computer screen, a printer or a speaker.

The event coordinator system 1102 includes a database 1112, a storage device 1114, a server 1116 and a workstation 1118 interconnected through a LAN 1120. An artisan will recognize that the database 1112, storage device 1114, and workstation 1118 can be implemented on one or more computers. These computers may be single-processor or multi-processor machines. An artisan will also recognize that the database 1112 can be part of the storage device 1114. The database 1112 comprises event data useful for coordinating and tracking events and may include, for example, information related to manufacturers, service providers, agencies, event personnel, retail stores, event specifications, tracked event results, payment information, or the like. In certain embodiments, the tracked event results include, for example, date and time information of when demonstration events took place, financial information (such as purchases made by event operators using event cards 702, rates paid to agencies for staffing demonstration events, and rates paid to event operators for participation in events), shipping information, event auditing information, consumer feedback information, retail store feedback information, event operator feedback information, combinations of the foregoing, or the like.

The event coordinator system 1102 receives data from a fund distribution service 108 and/or a point-of-sale network 212, such as the fund distribution service 108 and point-of-sale network 212 discussed in relation to FIG. 2. As discussed above, the point-of-sale network 212 records event information such as start time, end time, event ID, card ID, PIN number, purchase data, combinations of the foregoing, or the like. The purchase data includes purchase amount and, in certain embodiments, identification of items purchased by an event operator using an event card 702.

In certain embodiments, the purchase data also includes the amount of demonstrated product sold during promotional events. For example, if an event includes passing out samples of a certain breakfast cereal at a certain retail store, the point-of-sale network 212 will record how many units of the breakfast cereal were sold to customers of the retail store during the event. In certain such embodiments, the point-of-sale network 212 records the amount of product purchased by customers of the retail store as the products' bar codes are scanned or as the products' identity is otherwise entered into the cash registers 240 during checkout. In other embodiments, event operators report the amount of product sold during promotional events to the event coordinator system 1102.

The point-of-sale network 212 sends the event information to the fund distribution service 108 and/or the event coordinator system 1102. As discussed above, the fund distribution service 108 determines if a purchase amount for products purchased by an event operator falls within the balance of the event operator's event card 702. In certain embodiments, the fund distribution service 108 also checks that the items purchased using the event card 702 are authorized. The fund distribution service 108 either authorizes or denies the purchase and sends the purchase data and any other data it received from the point-of-sale network 212 to the event coordinator system 1102.

The event coordinator system 1102 uses the received data to evaluate the work performance of event operators and to evaluate the success of events. The event coordinator system 1102 also selectively provides portions of the received data and other event information to the agency systems 1104, the event operator systems 1108, the retailer systems 1122, and manufacturer systems 1111 through the network 1110 to coordinate and track past, present and future demonstration events. By providing selected portions of the data to the various parties involved in the demonstration events, the parties can advantageously evaluate the performance of the other parties and the value of the services they provide. In certain embodiments, at least portions of the event data is provided to one or more of the parties in real-time so the parties can coordinate and determine the status of demonstration events in a timely manner.

The storage device 1114 of the event coordinator system 1102 includes at least one software application that can be executed by the server 1116 to coordinate and track an event as described herein. Thus, event data can be exchanged between the event coordinator system 1102 and the agency systems 1104, event operator systems 1108, retailer systems 1122, and manufacturer systems 1111 through the network 1110. In certain embodiments, the agency systems 1104 can execute software applications hosted by the server 1116 and can directly access or update the event data stored in the event coordinator system's database 1112. In addition, or in other embodiments, the agency systems 1104 are standalone systems that can execute software programs to track events and update event data without being connected to the event coordinator system 1102 and/or the network 1110. In certain such embodiments, the agency systems 1104 are standalone systems that can execute software programs to track events and update event data without any communication or relationship with the event coordinator.

In certain standalone systems, event data can be exchanged between the event coordinator system 1102 and the agency systems 1104 through the network 1110. For example, the event coordinator system 1102 may coordinate and track events by updating at least a portion of the event data stored in the agency systems 1104. Thus, the agency systems 1104 can receive updated event data from the event coordinator system 1102 and can update the event data stored in the event coordinator's database 1112. Event data can be exchanged between the agency systems 1104 and the event coordinator 1102 through the network 1110 when desired or at prescheduled times. In an exemplary embodiment, the event data is exchanged at night or at the end of a business day.

In certain embodiments, the server 1116 in the event coordinator system 1102 hosts one or more user interfaces, such as web pages or the like, for coordinating and tracking promotional events. For example, the server 1116 may host a manufacturer or service provider website accessible by the manufacturer systems 1111 through the network 1110. By logging into the manufacturer website, the manufacturer systems 1111 can request new demonstration events for their products or services. The manufacturer systems 1111 can remotely specify the event dates and times, the geographical regions where the events will take place, the products or services to be demonstrated, the number of stores to demonstrate in, the name of specific stores or a chain of stores to demonstrate in, the agency to staff the events, the attributes of the event operators participating in the events, combinations of the foregoing, or the like.

In addition, or in other embodiments, the manufacturer systems 1111 can view the status or results of previously ordered product or service demonstrations through the network 1110. In certain such embodiments, the manufacturer systems 1111 can view, for example, identities of public locations (e.g., the specific retail stores or public parks) that have been scheduled to host the events, identities of agencies assigned to staff the events, identities and/or attributes of event operators assigned to participate in the event, dates and times when specific events actually occurred, amounts of free samples distributed during a particular event or group of events, percentages of increased product sales as a result of the events, audit results, consumer feedback results, event operator feedback results, retail store feedback results, event reports or summaries, and/or store report forms as discussed herein, combinations of the foregoing, or the like. In certain exemplary embodiments, at least a portion of the status or results of previously ordered product or service demonstrations is made available to the manufacturer systems 1111 through the manufacturer website as it becomes available to the event coordinator system 1102. Thus, the manufacturer systems 1111 can evaluate the success of particular events or groups of events in a timely manner so as to base business decisions thereon.

The server 1116 may also host, for example, one or more agency websites accessible by the agency systems 1104 through the network 1110. By logging into the agency website, the agency systems 1104 can access, download, or directly update event data in the event coordinator system's database 1112. In certain embodiments, the agency systems 1104 have exclusive access to respective portions of the database 1112 corresponding to their assigned events.

Through the agency website, the agency systems 1104 can, for example, receive notification of assigned events, view alerts or changes to assigned events, view or download event guidelines or instructions, view or download store report forms (discussed below) or other feedback forms, assign event operators to staff the events, view the assigned event operators' start times and end times for particular events, view products purchased by the event operators using event cards 702, track shipments from the event coordinator system 102 or manufacturer systems 1111, view amount of increased product sales as a result of specific events or groups of events, view event operator payment rates, view invoices from the event coordinator system 1102, request changes to invoices from the event coordinator system 1102, view retailer feedback, view consumer feedback, view event operator feedback, combinations of the foregoing or the like. Thus, the agency systems 1104 can coordinate demonstration events and track their respective performances as well as the performances of their respective event operators in a timely manner.

In certain embodiments, the server 1116 also hosts one or more retailer websites accessible by the retailer systems 1122 through the network 1110. By logging into the retailer website, the retailer systems 1122 can view event information for demonstrations scheduled for specific stores. For example, a store manager or other employee can view events scheduled to take place on specific dates and times. Thus, the store manager can be informed of and prepared for upcoming promotional events and can verify that each event operator present in the store has been scheduled to be there. In certain embodiments, the store manager can also view the products or services that will be demonstrated during specific events and the instructions provided to the event operators on how to conduct the events.

In certain other embodiments, by logging into a retailer website, the retailer systems 1122 can request new demonstration events through the network 1110 for products or services that they sale. The retailer systems can remotely specify event dates and times, number of stores to host the events, specific store locations to host the events, combinations of the foregoing, or the like. In addition, or in other embodiments, the retailer systems 1122 can view the status or results of previously ordered product or service demonstrations through the network 1110.

In certain embodiments, the server 1116 also hosts one or more event operator websites accessible to the event operator systems 1108. The event operator systems 1108 provide login information that includes data used to associate respective event operator systems 1108 with corresponding agency systems 1104 that the event operator is registered with, for example, as an employee or contractor. Through the network 1110, event operator systems can view event information for demonstrations to which they have been assigned. The event operators can view, for example, assigned event dates and times, changes to assigned event dates and times, instructions for participating in assigned events, pay rates for assigned events, start time and end time for previously performed assigned events, adjusted payments based on start time and end time for previously performed assigned events, payment processing for previously performed events, transaction history of their assigned event card 702, combinations of the foregoing, or the like.

Figure 12:
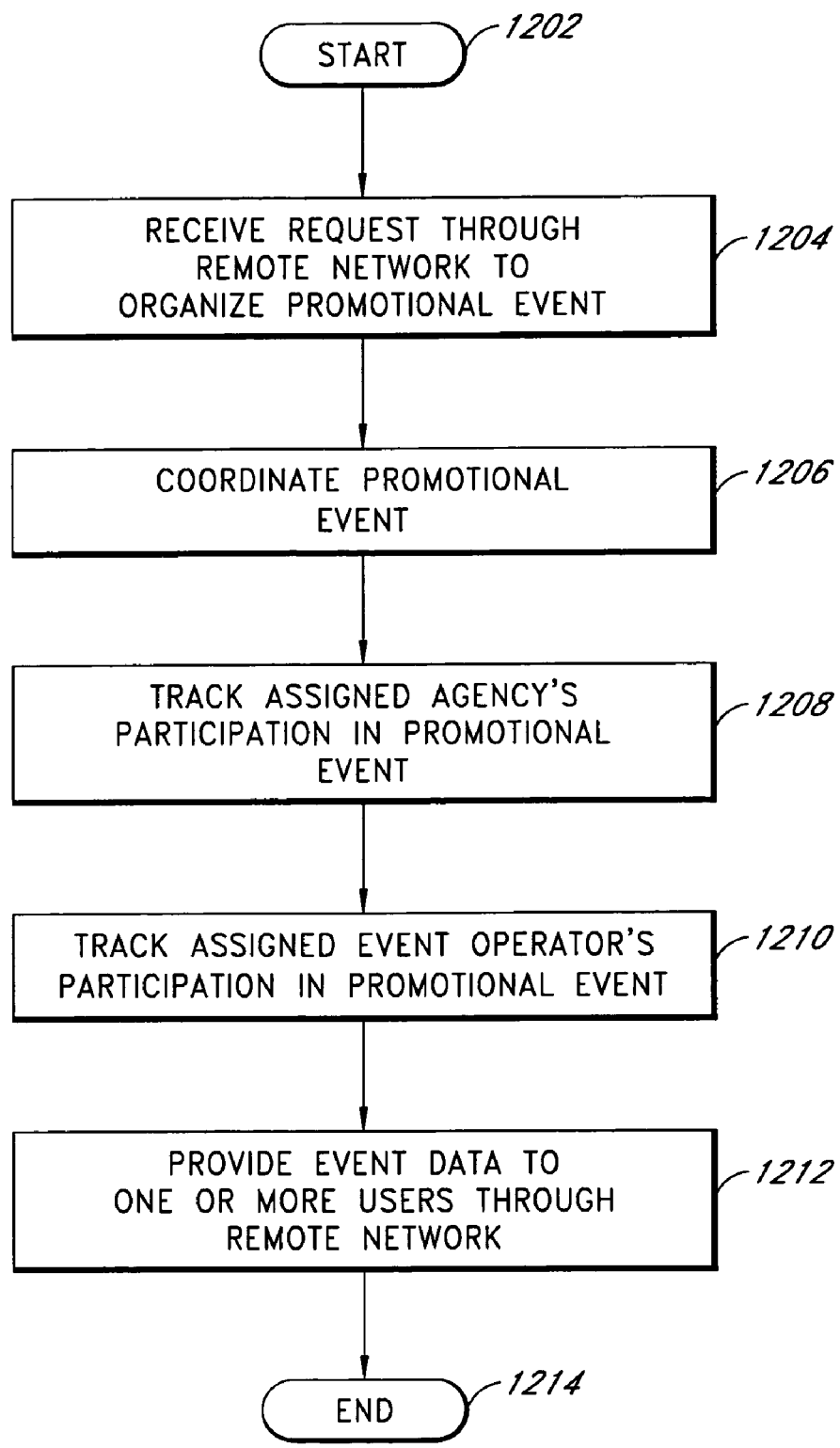
FIG. 12 is a flow chart illustrating portions of an event coordination and tracking process usable by the system 1100 shown in FIG. 11 according to certain embodiments of the invention.
Figure 13:
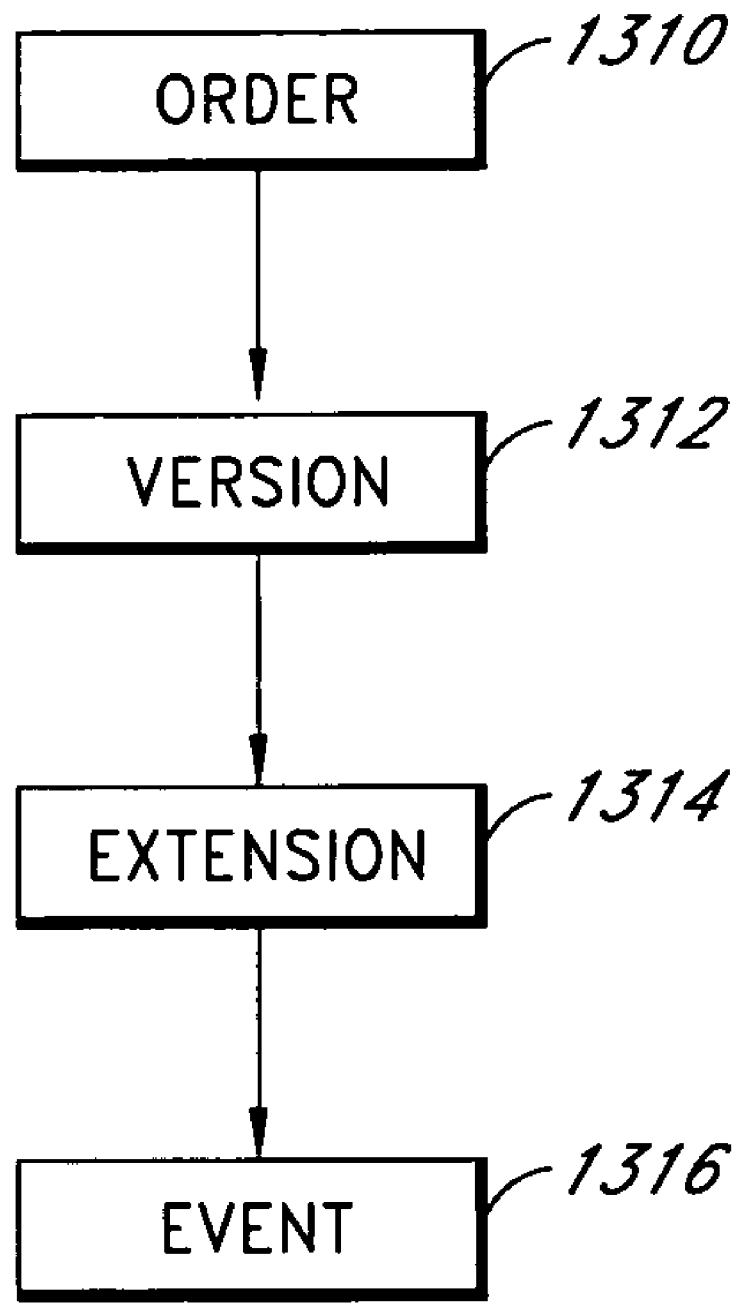
FIG. 13 is a block diagram illustrating relationships between various groups of promotional events.

FIG. 12 is a flow chart illustrating portions of an event coordination and tracking process 1200 usable by the system 1100 shown in FIG. 11 according to certain embodiments of the invention. While FIG. 12 shows various steps for coordinating and tracking events in a particular order, artisans will recognize that several of the steps shown can be carried out simultaneously and that other steps or other sequences of steps are also compatible with embodiments described herein. The process 1200 begins in a block 1202 and advances to a block 1204 where the event coordinator system 1102 receives a request through the remote network 1110 to organize a promotional event. In certain embodiments, a user requests a promotional event or group of promotional events through a remote user interface, such as one or more web pages. For purposes of discussion hereinbelow, FIG. 13 is a block diagram illustrating relationships between various groups of promotional events according to certain embodiments of the invention. As discussed in detail below, the event coordinator system 1102 receives an order 1310 from the user (e.g., one or more of the manufacturer systems 1111 or retailer systems 1122), defines at least one version 1312 of the order 1310, and defines at least one extension 1314 comprising one or more events 1316.

The order 1310 specifies products or services to be demonstrated and requests demonstration dates and geographical regions where the demonstrations will take place. The order 1310 may also specify how many stores in which to demonstrate the product or service, names of specific stores or chain of stores in which to demonstrate the product or service, attributes of the event operators participating in the events, combinations of the foregoing, or the like.

Figure 14A:
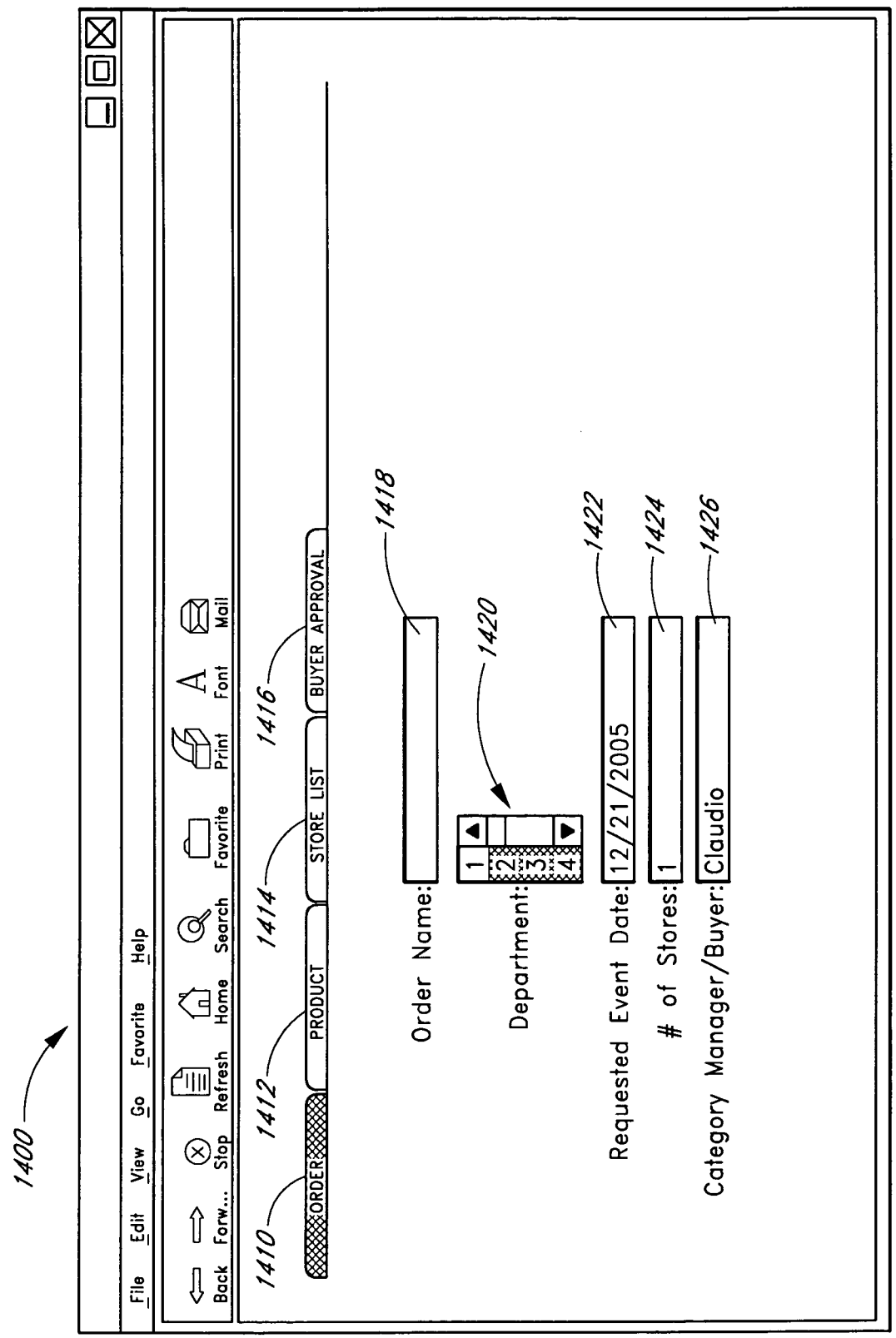
FIGS. 14A-14C are general representations of a web page for entering order information into the system shown in FIG. 11.
Figure 14B:
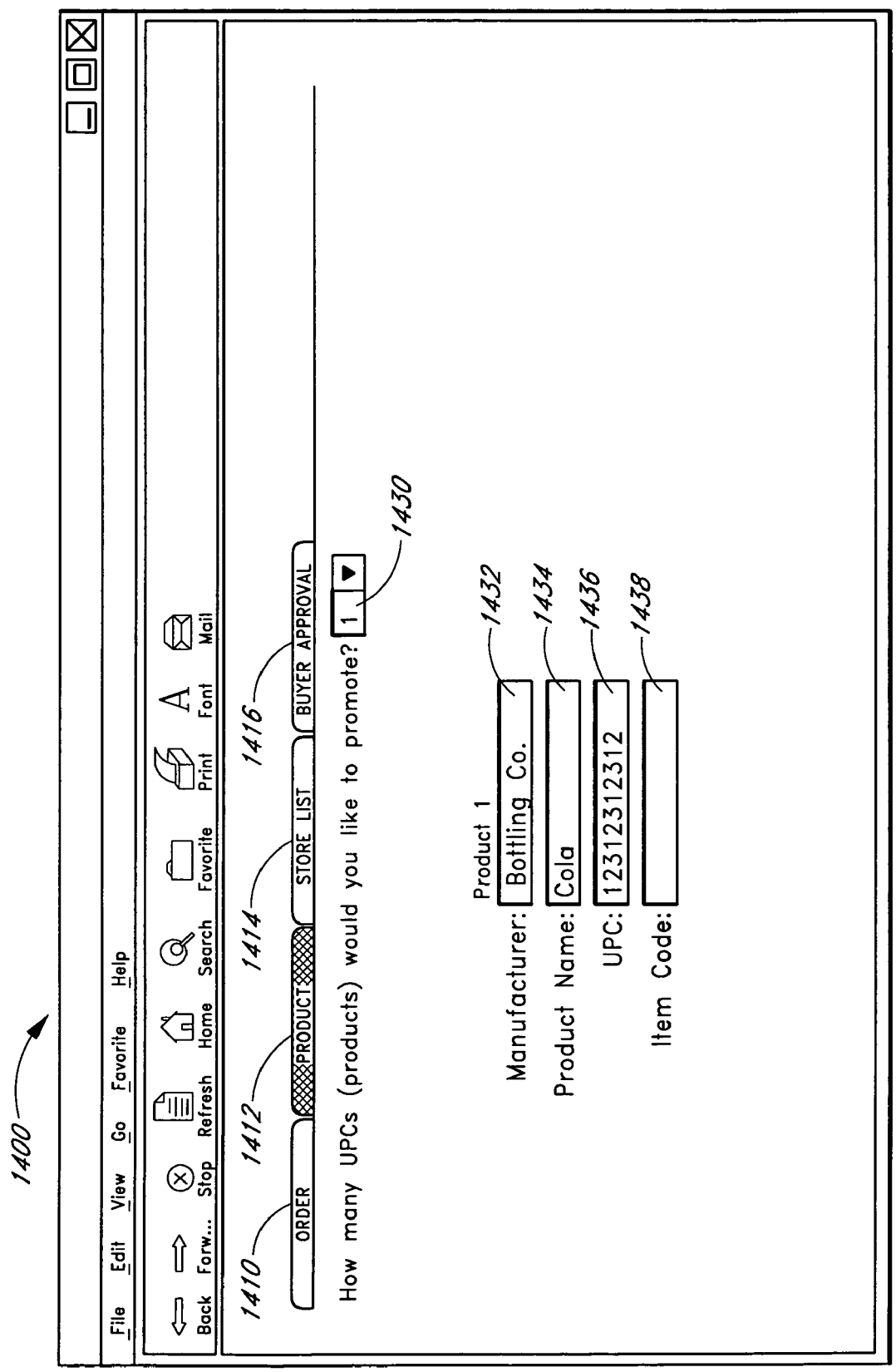
Figure 14C:
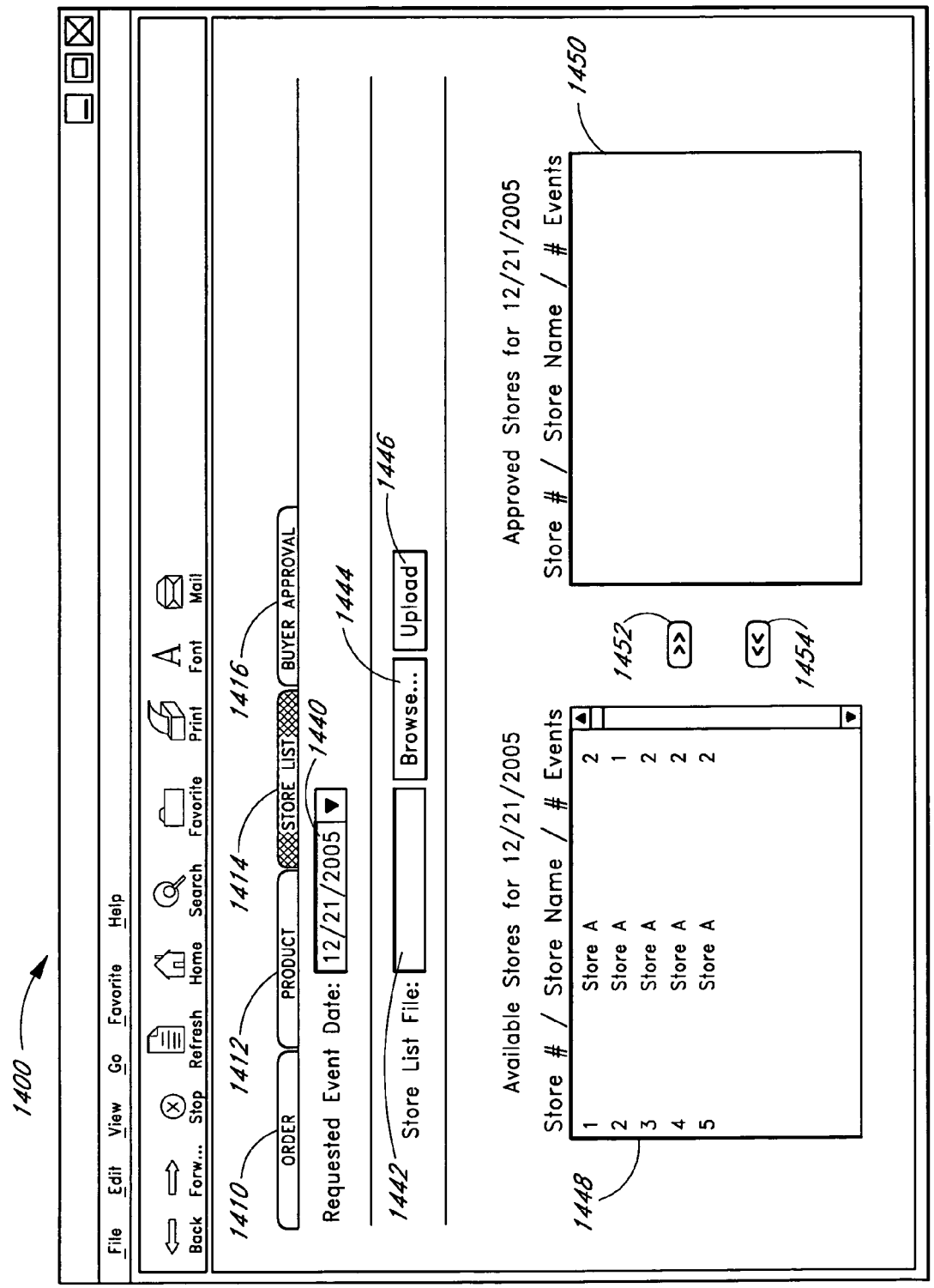

FIGS. 14A-14C are general representations of a web page 1400 according to certain embodiments for entering order 1310 information into the system 1100. The web page 1400 includes an order tab 1410, a product tab 1412, a store list tab 1414 and a buyer approval tab 1416. By way of example, large retail chains may have managers or buyers that buy or manage certain types of products or services for all or a portion of the retail stores in the chain. Such managers or buyers can use the retailer systems 1122 to access the exemplary order tab 1410 illustrated in FIG. 14A and request demonstrations of the products or services they are assigned to buy or sell. The order tab 1410 includes data entry fields for an order name (field 1418), a department (field 1420) that buys or sells the products or services to be demonstrated, requested event date (field 1422) and a number of stores field 1424. In this example, the user can also enter their name in a "category manager/buyer" field 1426.

As another example, the order 1310 may be entered into the system 1100 by product manufacturers or service providers through the manufacturer systems 1111. In certain such embodiments, the user enters a desired date into the requested event date field 1422 and also selects a zone or region in a data entry field (not shown) where the products or services are to be demonstrated. The zones or regions may specify, for example, portions of a city, state, country or other geographical region. In certain embodiments, the user can also select an agency to staff the demonstrations. In addition, or in other embodiments, the user can also request that the demonstrations correspond to dates in which product or service advertisements will be published, thus increasing overall exposure to the products or services.

FIG. 14B illustrates the product tab 1412 according to certain embodiments. The product tab 1412 allows the user to specify the products or services to demonstrate. The product tab 1412 includes data entry fields for specifying the number of products (field 1430) to promote as part of the order 1310. The product tab 1412 also includes data entry fields for specifying a manufacturer (field 1432) and a product name (field 1434) of the product or service to demonstrate. In certain embodiments, the product tab 1412 also includes data entry fields for a UPC code (field 1436) and an item code (field 1438) to further identify the specific products or services to demonstrate.

FIG. 14C illustrates the store list tab 1414 according to certain embodiments. The store list tab 1414 allows the user to specify the stores or other public locations where the demonstrations corresponding to the order 1310 will be held. The store list tab 1414 includes an available stores list 1448 for a particular date selected in a requested event date field 1440. In certain embodiments, the list of available stores 1448 is generated by filtering data stored in an electronic file comprising identities of retail stores and other public locations. The user selects the electronic file by entering the name and storage location of the file in a store list file field 1442 or by pressing a browse button 1444 and selecting an upload button 1446. The available stores list 1448 includes the retail stores or other public locations that meet the parameters specified in the order tab 1410 including, for example, being located in a particular zone or region or being managed by a particular staffing agency.

The user highlights a particular store and presses a selection button 1452 to move the store from the available stores list 1448 to an approved stores list 1450. The stores moved to the approved stores list 1450 will be included in the order 1310. Similarly, the user can remove a store from the approved store list 1450 by highlighting the store in the approved stores list 1450 and pressing an unselect button 1454. In certain embodiments, the number of events already scheduled for a particular store on the particular date indicated in the requested event date field 1440 is shown in the available stores list 1448. Thus, the user can select stores to include in the order 1310 based at least in part on the number of events already scheduled for the particular store on the desired demonstration date. Some retail stores may only allow a certain number of demonstration events to be performed in a particular store at a time. For example, a particular store may only allow up to four demonstration events per day. In such circumstances, stores exceeding four demonstration events on the particular day would not be displayed in the available stores list 1448.

After making selections in the order tab 1410, the product tab 1412 and the store list tab 1414, the user can submit the order 1310 in the buyer approval tab 1416. Although not shown, in certain embodiments, the buyer approval tab 1416 allows the user to download a buyer approval form that can be printed and signed. In other embodiments, the user can approve the order 1310 electronically in the buyer approval tab 1416 through an electronic signature or by entering in an authorization code. In certain embodiments, the buyer approval tab 1416 includes a field to enter in notes related to the order 1310.

Referring again to FIGS. 12 and 13, the process 1200 advances from the block 1204 to a block 1206 where the event coordinator system 1102 coordinates the promotional event as described above in relation to FIGS. 1-10. After receiving the order 1310, the event coordinator system 1102 generates at least one version 1312 of the order 1310 that defines products or services to demonstrate and general guidelines such as the amount of time that corresponding events 1316 will last, materials to be used, materials to be shipped to agencies or event operators, and other general information regarding events 1316 corresponding to the version 1312.

In certain embodiments, the workstation 1118 of the event coordinator system 1102 comprises a graphical user interface (not shown) having data entry fields that allow a user to specify the general guidelines. In certain such embodiment, at least a portion of the data entry fields are automatically populated with information electronically received as part of the order 1310. The user then provides additional information in other data entry fields. For example, requested demonstration dates, products to be demonstrated, and the number of events 1316 may be automatically entered into the event coordinator system 1102. The user may then use the graphical user interface to specify marketing materials to be displayed, necessary equipment (e.g., frying pan, cooking utensils, apron, extension cord, tablecloth, disposable napkins and utensils to distribute with the samples, etc.), and other general information regarding the events 1316.

In certain embodiments, the event coordinator system 1102 includes marketing and purchasing sub-systems (not shown) configured to automatically receive and process portions of the general guidelines. For example, a purchase request for material or equipment specified by the user for the events 1316 may be automatically sent to the purchasing sub-system for processing. Similarly, a request to generate marketing materials such as posters to display or promotional materials to pass out during the events may be automatically sent to the marketing sub-system for processing.

As part of the coordination process, the event coordinator system 1102 defines at least one extension 1314 by grouping event locations with event dates and times, assigning an agency to staff the events 1316 corresponding to the extension 1314, and generating instructions for the particular events 1316 corresponding to the extension 1314. For the events 1316, the event coordinator system 1102 can generate packages or kits including the materials to be shipped to the agencies or event operators assigned to staff the events 1316. The kits may include, for example, samples of the product to distribute, disposable utensils, sanitary gloves, aprons, instructions, coupons, promotional items, advertisements to display, event cards 702, combinations of the foregoing, or the like. In certain embodiments, the event coordinator system 1102 includes a shipping/warehousing sub-system (not shown) configured to receive information about the events 1316 and to assemble and ship the kits to the assigned agencies. For example, the shipping/warehousing subsystem may automatically receive address shipping information when the agencies are assigned and be notified when the materials to be shipped to the agencies have been received or are otherwise ready to be shipped.

In certain embodiments, the database 1112 of the event coordinator system 1102 includes parameters for selecting specific event locations. The parameters may include, for example, limitations set by certain retail stores on the types of events that they are willing to host, restrictions on the number of events that can be hosted in the retail stores on one day, days of the weeks the retail stores are willing to host events, the type of coupons that the retail stores will accept or allow to be distributed, combinations of the foregoing, or the like. The event coordinator system 1102 prevents a user from selecting a specific retail store location for a specific event if the retail store's parameters are not satisfied.

In certain embodiments, the event coordinator system 1102 assigns the agency based at least in part on a request from the manufacturer or retailer that placed the order 1310. In certain other embodiments, the event coordinator system 1102 assigns the agency based at least in part on the retail stores where the events 1316 will take place. In certain such embodiments, the database 1112 of the event coordinator system 1102 comprises information defining relationships between at least one agency and at least one retail store. For example, an agency may have an agreement with a particular retail store or chain of retail stores to provide exclusive staffing services for promotional events. As another example, a retail store or chain of retail stores may specify a certain agency as its primary or secondary source of staffing services for promotional events. In such embodiments, the event coordinator system 1102 automatically assigns agencies to staff events where a relationship exists between the agency and the retailer. In addition, or in other embodiments, the event coordinator system 1102 assigns agencies based at least in part on the geographical location of where the events 1316 in the extension 1314 will take place.

In certain embodiments, the event coordinator assigns the agency based at least in part on the agency's ability to staff the events 1316 with qualified event operators. Some promotional events 1316 are more successful if the event operators have skills related to using a particular product. For example, a skilled chef may be better qualified to demonstrate the use of cooking utensils than a person who does not know how to cook or handle utensils. Some promotional events 1316 are more successful if the event operators are based on the target consumer. For example, a person who is bald is likely to be less successful at promoting hair care products than a person with a healthy head of hair. Further, some promotional events 1316 ask the event operators to provide equipment for the event 1316. For example, event operators may be asked to provide their own microwave, toaster oven, electric frying pan, or the like at an event 1316 where food is prepared. U.S. patent application Ser. No. 11/022,129, filed Dec. 23, 2004, and hereby incorporated by reference herein, describes systems and methods that can be used according to certain embodiments of the present invention for coordinating promotional events 1316 and assigning qualified event operators to participate in the promotional events 1316.

Once an agency is assigned, the event coordinator system 1102 automatically sends the agency's address information to the shipping/warehousing sub-system discussed above. It should be recognized that more than one shipping address may be specified for each agency. The event coordinator system 1102 also automatically calculates a budget for the events based on rate information for the assigned agency. In certain embodiments, certain agencies receive different compensation rates for staffing events at different retail stores or chains of retail stores. Thus, once an agency is assigned to a particular event at a particular retail store or chain of retail stores, the budget for the events is automatically updated. In certain such embodiments, the budget is also automatically updated when the event coordinator system receives information to generate the order 1310, version 1312 and/or extension 1314. A user can then modify the budget, if necessary, and submit the budget to another user for approval.

In certain embodiments, the event coordinator system 1102 generates the instructions for the particular events 1316 and automatically makes the instructions available to the assigned agency systems 1104 and/or the assigned event operator systems 1108 through the network 1110. In certain such embodiments, the event coordinator system 1102 automatically generates at least a portion of the instructions from information received when generating the order 1310, version 1312 and/or extension 1314. A user can then modify the instructions or add information to the instructions and make the instructions available for approval by another user. In certain embodiments, the user can select instruction sets or wording for the instructions from a plurality of instruction sets. Once the instructions are approved, the assigned agency and/or event operators can access them through the network 1110. The instructions can be modified or replaced at a later time, if needed, and the assigned agency and/or event operators notified of the change through the network 1110.

The process 1200 advances from the block 1206 to a block 1208 where the event coordinator system 1102 tracks the assigned agency's participation in the promotional event 1316. As the event coordinator system 1102 coordinates the event 1316, it exchanges and records information with the agency system 1104 assigned to the event 1316. For example, the event coordinator system 1102 can record financial information (such as the amount to be paid to the agency system 1104 or requests to change the amount), event operator information (such as whether an event operator has been assigned to a future event or whether an event operator has been paid for a past event), shipping information, event auditing information, consumer feedback information, retail store feedback information, event operator feedback information, combinations of the foregoing, or the like.

The process 1200 then advances from the block 1208 to a block 1210 where the event coordinator system 1102 tracks the assigned event operator's participation in the promotional event 1316. As discussed above, the event coordinator system 1102 receives event data such as a time that the event operator started the event, a time that the event operator ended the event, an identity or location of the event, an event ID, an event card ID, a PIN number, an event operator identification, combinations of the foregoing or the like. The event coordinator system 1102 also receives purchase data including a purchase amount and, in certain embodiments, an identification of items purchased by the event operator with an event card 702. In certain embodiments, the purchase data also includes the amount of product sold at the retail store hosting the event 1316 while the event 1310 is occurring.

In other embodiments, the event operators are not provided event cards 702 and the assigned event operator's participation in the promotional event 1316 is tracked by receiving report data, such as the store report form. In certain such embodiments, the report data is received through the Voice Recognition Unit (VRU), as discussed above. The report data may include a time that the event operator started the event, a time that the event operator ended the event, a time that the event operator submitted the report data, an identity or location of the event, an event ID, an event operator identification, combinations of the foregoing or the like. When the report data is received, the status of the promotional event 1316 is changed from "pending" to "complete." If the report data is not received after a predetermined amount of time, the status of the promotional event is changed to "not reported."

The process 1200 then advances from the block 1210 to a block 1212 where the event coordinator system 1102 selectively provides the event data collected in blocks 1204, 1206, 1208, and 1210 to one or more users through a remote network. For example, the event operator systems 1108 can access event data through the network 1110 corresponding to assigned events 1316 including, for example, scheduled event dates and times, event locations, rates paid for events, when payments for past events will occur, changes to payments for past events based on factors such as the actual amount of time the event was carried out, recorded start and end times for past events, event instructions, notices or changes to the event instructions, the status of event materials shipped from the event coordinator system 1102 or assigned agency system 1104, items purchased using an event card 702, balance remaining on an event card 702, combinations of the foregoing, or the like.

Figure 15:
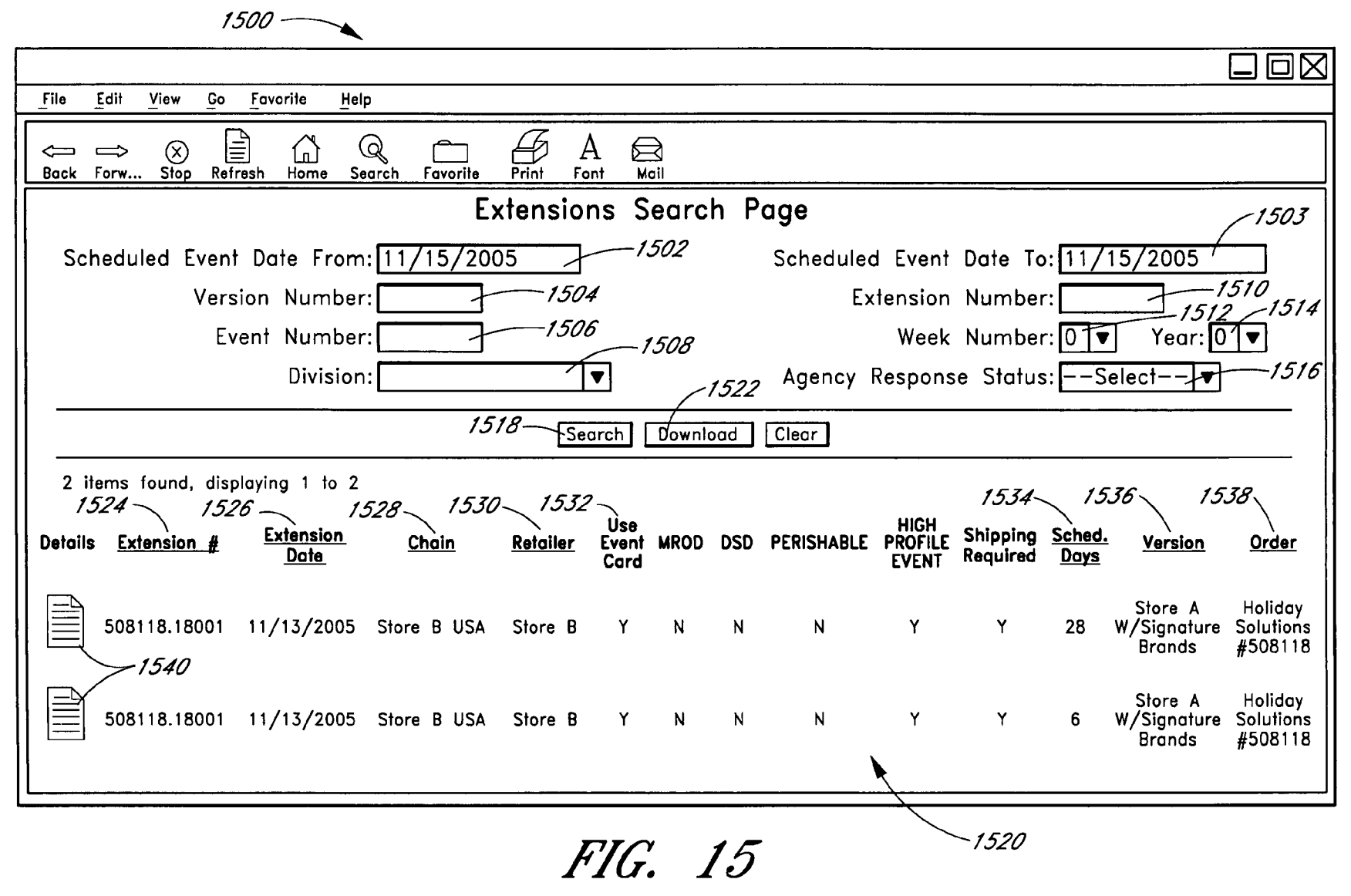

FIG. 15 is a general representation of a computer user interface 1500 according to certain embodiments for accessing event data organized by extensions 1314. The user interface 1500 can be used, for example, by users of the event coordinator system 1102 and/or the agency systems 1104 to coordinate and track events 1316. The user interface 1500 includes data entry fields for searching for event data by scheduled event date from (field 1502), scheduled event date to (field 1503), version number (field 1504), event number (field 1506) for specifying an event ID, division (field 1508) for specifying a particular group of retail stores, extension number (field 1510), week number (field 1512), year (field 1514), and agency response status (field 1516) for specifying extensions 1314 that an agency has or has not acknowledged being assigned to staff.

A user can search for event data corresponding to an extension 1314 by entering search criteria into one or more of the data entry fields and pressing a search button 1518. The user interface 1500 displays search results 1520 corresponding to extensions 1314 that meet the search criteria. The search results can also be saved by selecting a download button 1522. The search results 1520 include display fields that provide a brief description of the extensions 1314 including extension number (field 1524), extension date (field 1526), chain of retail stores (field 1528) hosting the events 1316, name of the retailer (field 1530) hosting the events 1316, required or requested usage (field 1532) of an event card 702 for the extension 1314, number of scheduled days (field 1534) for the extension 1314, corresponding version identification (field 1536) and corresponding order identification (field 1538). Links 1540 are provided to access detailed information for specific extensions 1314.

Figure 16A:
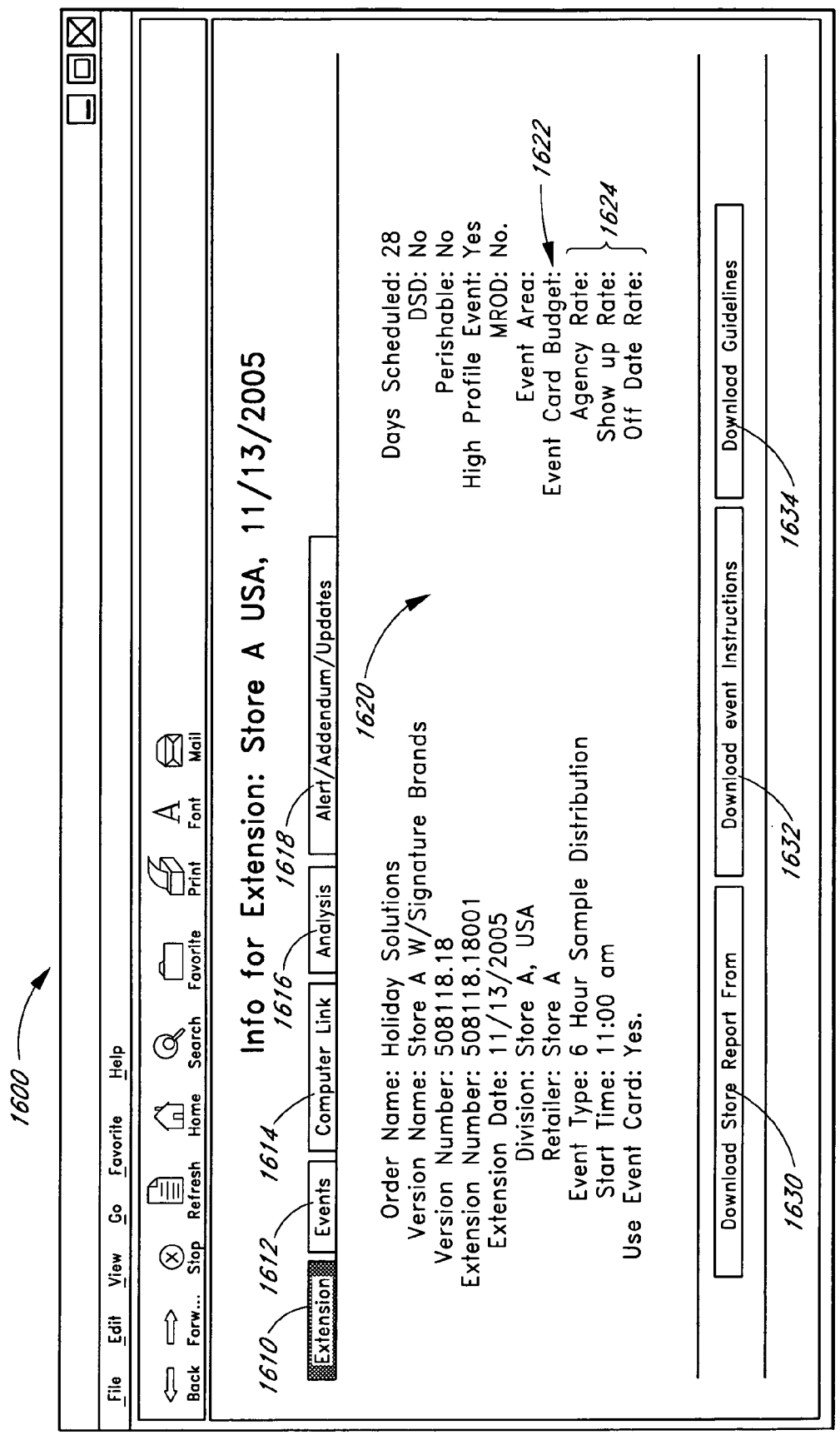

FIGS. 16A-16D are general representations of a user interface 1600 accessible by the event coordinator system 1102 and/or the agency systems 1104 according to certain embodiments of the invention for coordinating and tracking event data corresponding to an extension 1314. The user interface 1600 includes an extension tab 1610, an events tab 1612, a computer link tab 1614, an analysis tab 1616, and an alert/addendum/updates tab 1618. FIG. 16A illustrates the extensions tab 1610 which displays extension information 1620 configured to provide a general description of the extension 1314 as discussed above. The displayed extension information 1620 also includes event card budget information 1622 configured to indicate an amount by which to increment the balance of a requesting event card 702, as discussed above.

The displayed extension information 1620 also includes rate information 1624 that indicates the rate at which the assigned agency will be paid per event 1316 corresponding to the extension 1314. The rate information 1624 may also include adjusted rates. For example, if an event operator goes to a retail store to participate in an event 1316, but is turned away by the store manager, the agency will receive a "show up" rate that is less than the regular agency rate. In certain embodiments, the show up rate is approximately half the regular agency rate. As another example, if the event operator executes the event 1316 on a day that is not scheduled for the event, the agency will receive an "off date" rate that is less than the regular agency rate.

The extension tab 1610 also includes a first button 1630 to download store report forms, a second button 1632 to download event instructions, and a third button 1634 to download guidelines. The store report forms comprise questions to be answered by the event operators after completing an event 1316 such as the number of samples distributed, the general reaction of potential customers who received the samples, the amount of product sold, and the like. In certain embodiments, the store report forms are printed, filled out by hand and delivered to the assigned agency or event coordinator. In other embodiments, the store report forms' results are provided to the assigned agency system 1104 or the event coordinator system 1102 using a Voice Recognition Unit (VRU) that accepts input by voice recognition, or a device that accepts input from the keypad of a telephone (including a cellular phone), from the keyboard of a computer or personal digital assistant, or from other wired or wireless electronic devices.

The guidelines provide general information to the assigned agency for staffing the events 1316. For example, the guidelines may indicate how long the events 1316 will last, materials to be used, materials to be shipped to agencies or event operators, and other general information regarding events 1316 corresponding to the version 1312. The event instructions provide information to the event operators on how to execute the events 1316. For example, the event instructions include a description of products or services to be demonstrated, the configuration of a table or booth for conducting the demonstration including placement of advertising material or the like, recipes for preparing any food products to be distributed, event time and location information, combinations of the foregoing, or the like.

FIG. 16B illustrates the events tab 1612 which allows the user to access information for specific events 1316 using one or more event buttons 1640. The events tab 1612 includes display fields that display information such as the event ID number (field 1642), event status information (field 1644), assigned agency identification number (field 1646), retail store information (field 1648), scheduled date (field 1650) of the event 1316, actual date (field 1652) the event 1316 occurred, and information indicating modifications (field 1654) to the event data since last accessed.

Figure 16D:
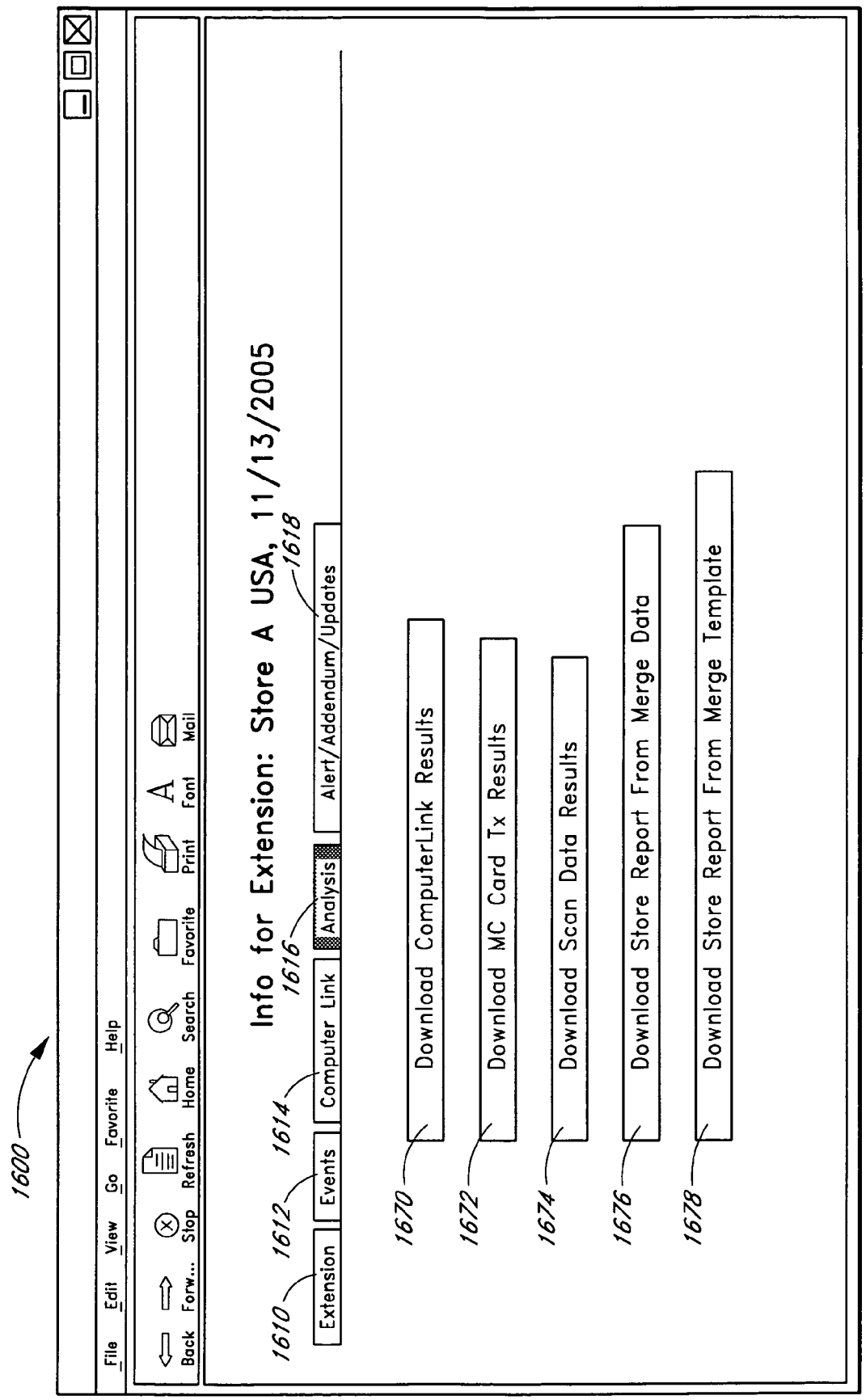

FIG. 16C illustrates the computer link tab 1614 which displays the reported status 1660 of particular events. For example, the computer link tab 1614 may display answers to survey questions in the store report forms discussed above. FIG. 16D illustrates the analysis tab 1616 which allows a user to access and analyze the event data by selecting a first button 1670, a second button 1672, a third button 1674, a fourth button 1676, and a fifth button 1678. The first button 1670 downloads the information available on the computer link tab 1614 discussed above. The second button 1672 downloads event card 702 transaction results including, for example, products purchased using the event cards 702, remaining balances on the event cards 702, corresponding event operators, corresponding events 1316, and the like.

The third button 1674 downloads scan data results that identify the amount of products sold in retail stores while hosting events demonstrating the products in the retail stores. The fourth button 1676 downloads store report form results that have been merged or that are in a format that can be merged and otherwise analyzed for a group of events. For example, information from the store report forms can be combined using a merge template downloaded using the fifth button 1678 and analyzed to determine the success of the extension 1314 as a whole.

Although not shown, the alert/addendum/updates tab 1618 notifies the user when an extension 1314 or its corresponding events 1316 change. For example, if the date of an event 1316 changes, the assigned agency is notified through the alert/addendum/updates tab 1618 so that the assigned agency can then make adjustments to its schedule and notify the assigned event operators.

FIGS. 17A-17D are general representations of a user interface accessible by the event coordinator system 1102 and the agency systems 1104 for coordinating and tracking event data for specific events 1316. In certain embodiments, the user interface 1700 is also accessible by the event operator systems 1108. For example, in certain such embodiments, an event operator who participated in a particular event 1316 can access the user interface 1700 through the network 1110 to view event data such as recorded log-in time and log-out time, the authorized budget for the event, purchases made using their assigned event card 702, and other information related to the event as discussed below.

Figure 17A:
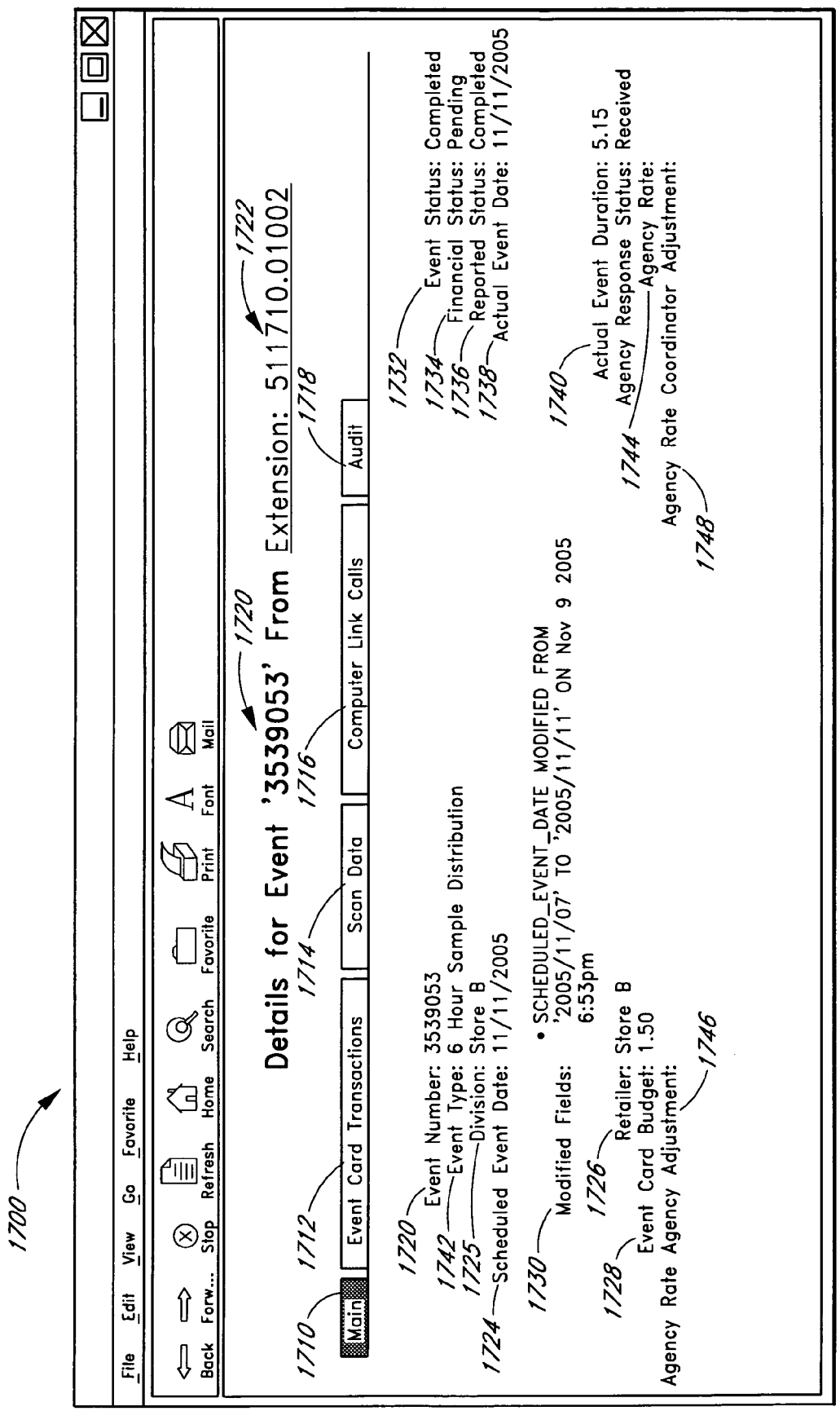

The user interface 1700 includes a main tab 1710, an event card transactions tab 1712, a scan data tab 1714, a computer link calls tab 1716, and an audit tab 1718. FIG. 17A illustrates the main tab 1710 which is configured to display a general description of the particular event 1316 including an event number (field 1720), a corresponding extension number (field 1722), a scheduled event date (field 1724), a location for the event (fields 1725 and 1726), an authorized event card budget (field 1728), and an indication of fields that have been modified (field 1730).

The main tab 1710 also displays status information for the particular event 1316 including whether the event 1316 has been completed (field 1732), whether the assigned agency and/or event operator has been paid for the event (field 1734), and whether the event operator has reported the event (field 1736) by, for example, providing the information on the store report form discussed above to the event coordinator system 1102. If the event 1316 has been completed, the main tab 1710 also displays the actual event date (field 1738) and the actual event time (field 1740). Thus, a user can compare the actual event date field 1738 and the actual event time field 1740 to the scheduled event date field 1724 and an agreed upon duration of the event (field 1742) to determine whether the assigned agency's compensation rate (field 1744) should be adjusted. The main tab 1710 displays adjustments requested by the assigned agency (field 1746) and adjustments approved or made by the event coordinator (field 1748).

Figure 17B:
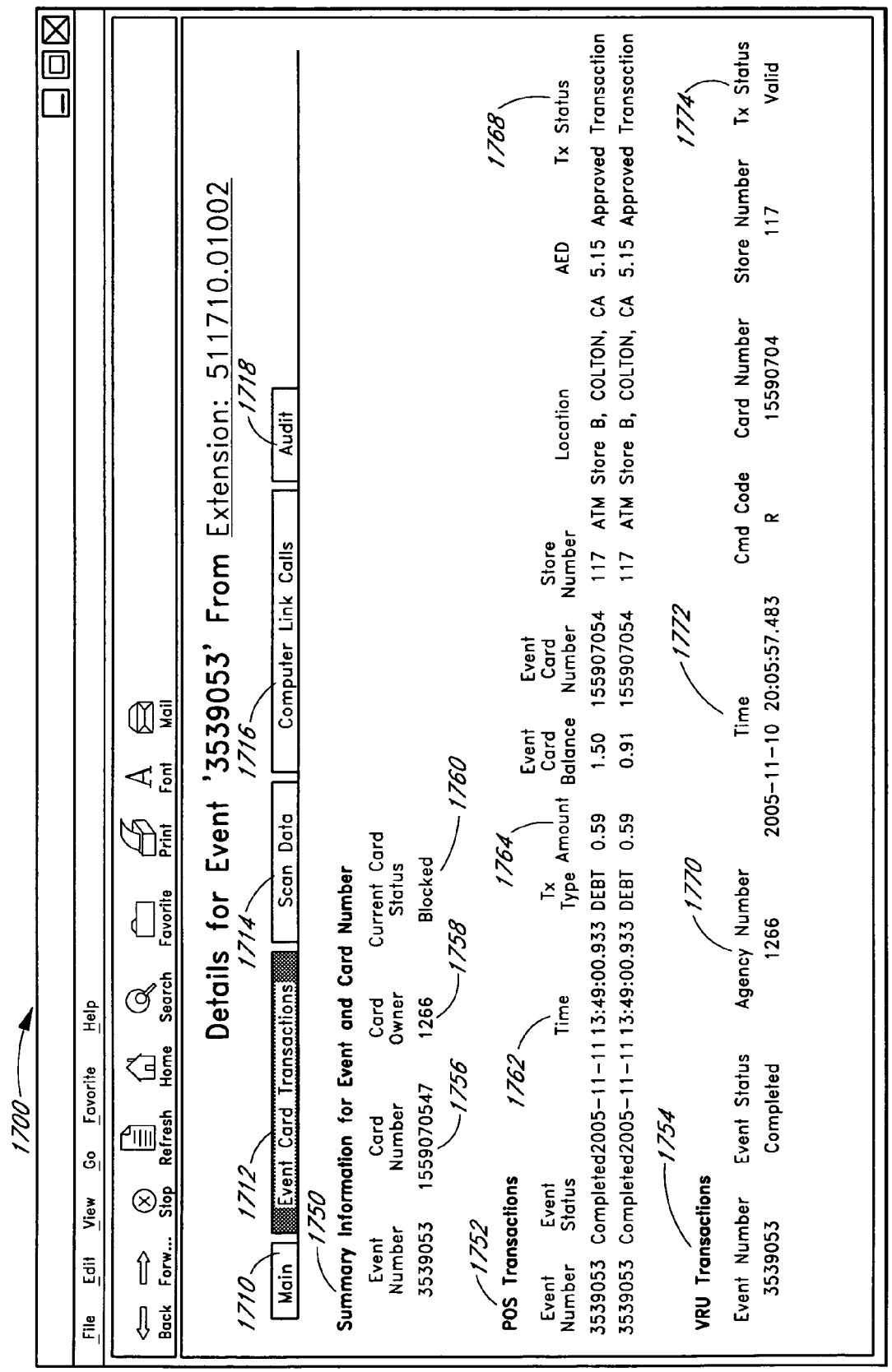

FIG. 17B illustrates the event card transactions tab 1712 that displays a summary section 1750, a point-of-sales (POS) transactions section 1752, and a voice-recognition unit (VRU) transactions section 1754. The summary section 1750 displays general information related to an event card 702 used in connection with a particular event 1316. For example, the summary section 1750 displays a card number (field 1756), a card owner identification (field 1758), and a current card status (field 0.1760) that indicates whether the event card 702 has been activated, deactivated or blocked, as discussed above. The POS transactions section 1752 displays information for each transaction made with an event card 702 for the particular event 1316 including, for example, the time (field 1762) of the transaction, the dollar amount (field 1764) of the transaction, the event card's balance (field 1766) after the transaction, and the transaction's status (field 1768) which indicates whether the transaction was approved or denied.

As discussed above, prior to starting a particular event 1316, the event operator activates an event card 702 using an automated device such as a VRU to contact a card administration system. The card administration system authorizes the event card 702 to be used for the particular event 1316 and associates the event card 702 with the event's authorized budget. The VRU transactions section 1754 indicates information related to activation of event cards 702 by event operators and include an agency number (field 1770) associated with the event operator using the event card 702, a time (field 1772) when the event card 702 was activated, and a transaction status (field 1774) which indicates whether the activation was valid.

Figure 17C:
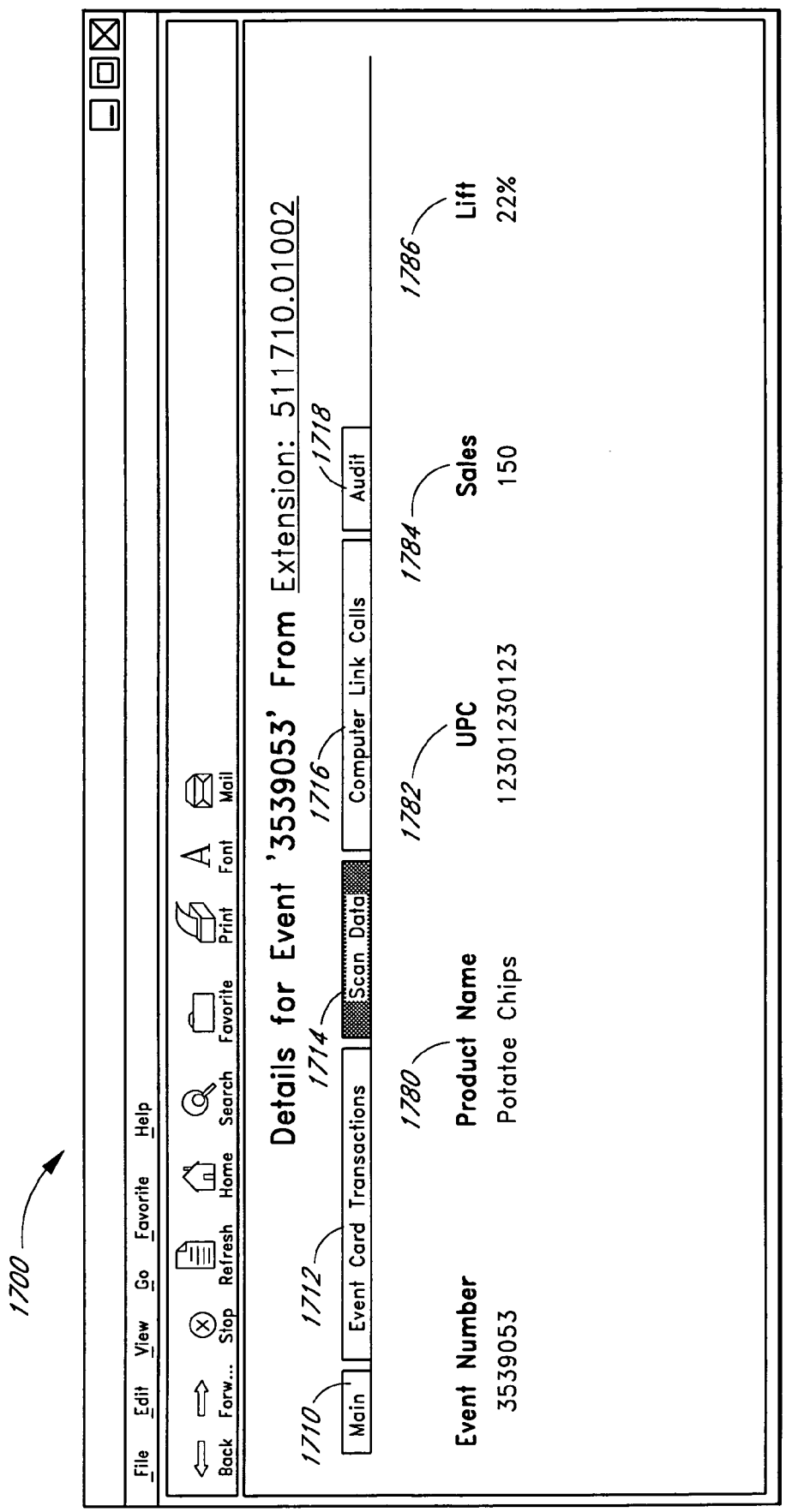

FIG. 17C illustrates the scan data tab 1714 that displays a product name (field 1780) for the product being demonstrated during the particular event 1316, a UPC number (field 1782) specifically identifying the demonstrated product, and the number of sales (field 1784) of the demonstrated product that were sold at the event location during the particular event 1316. As shown in FIG. 17C, in certain embodiments, the scan data tab 1714 also displays a percentage lift (field 1786) of increased product sales as a result of the particular event 1316. The percentage lift field 1786 is a comparison of demonstrated product sales made during the particular event 1316 and sales of the same product that were made at the same location prior to the particular event 1316 over a similar period of time as the particular event 1316. Thus, the percentage lift field 1786 provides at least partial indication of the success of the particular event.

Figure 17D:
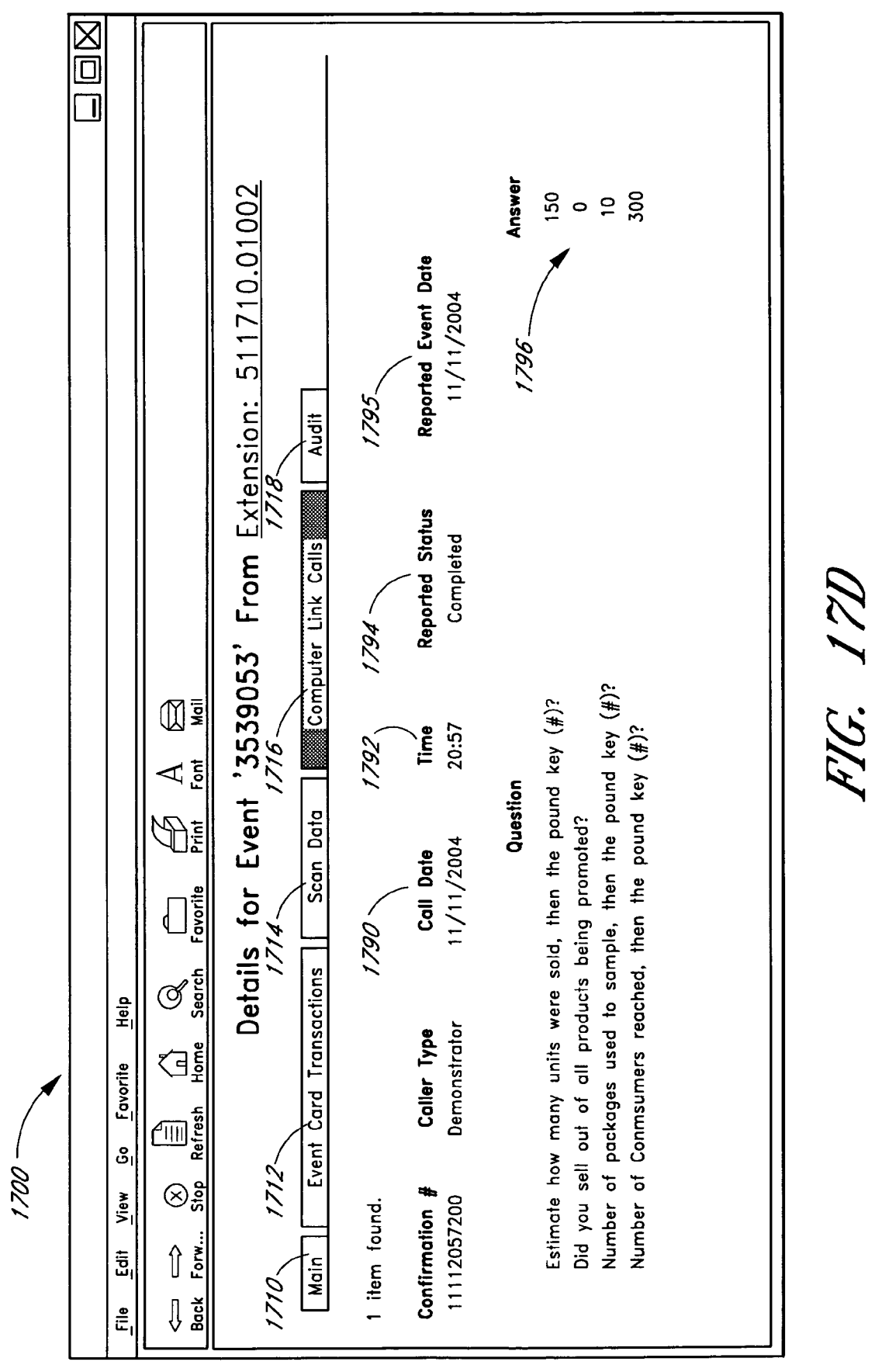

FIG. 17D illustrates the computer link calls tab 1716 that displays event feedback from an event operator participating in the particular event 1316. As discussed above, after completing the particular event 1316, the assigned event operator fills out a store report form comprising one or more questions such as the amount of promoted product sold during the particular event 1316, whether the promoted product sold out, the amount of product distributed as samples, the number of consumers reached or contacted, or the like. In certain embodiments, the event operator may call a VRU to provide the responses to the questions. The computer link calls tab 1716 displays a date (field 1790) when the call was received, a time (field 1792) when the call was received, a reported status (field 1794) indicating whether the particular event 1316 was completed, and a reported event date (field 1795). The computer link calls tab 1716 also includes a question and answer section 1796 that displays the questions on the store report form and the answers provided by the event operator. In other embodiments, the user can enter or edit the answers directly in the question and answer section 1796.

In certain embodiments, auditors are hired by the manufacturer, the event coordinator and/or the agency to randomly attend events to determine whether the guidelines and/or instructions provided to the assigned agency and/or event operator are correctly followed. Although not shown, the audit tab 1718 displays the results of such an audit of the particular event 1316 and may include audit data such as whether the event occurred during the planned time, whether the correct product was being correctly prepared and distributed, whether sanitary standards were followed, whether the event card 702 was properly used, and the like.

Figure 18A:
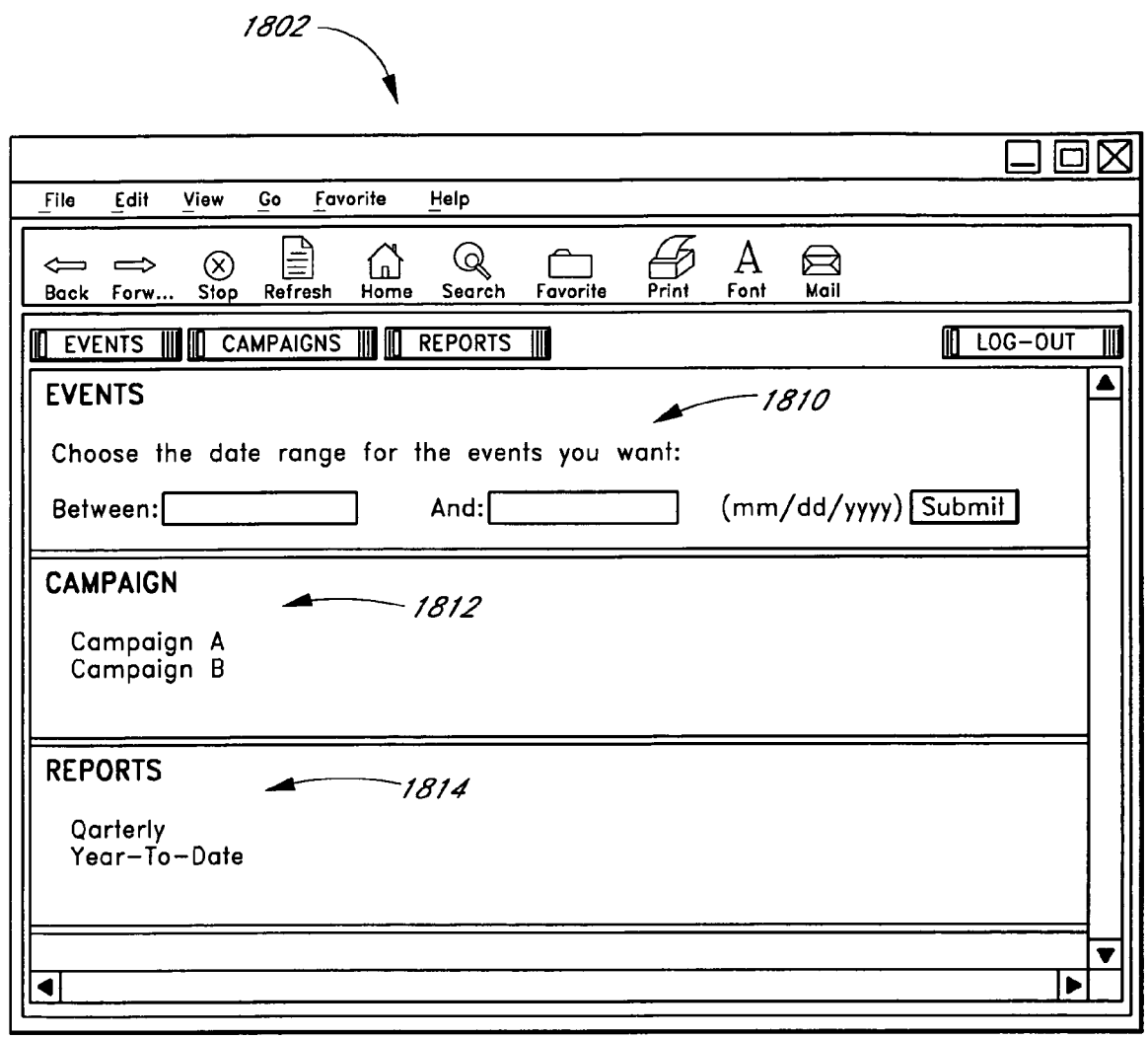
Figure 18B:
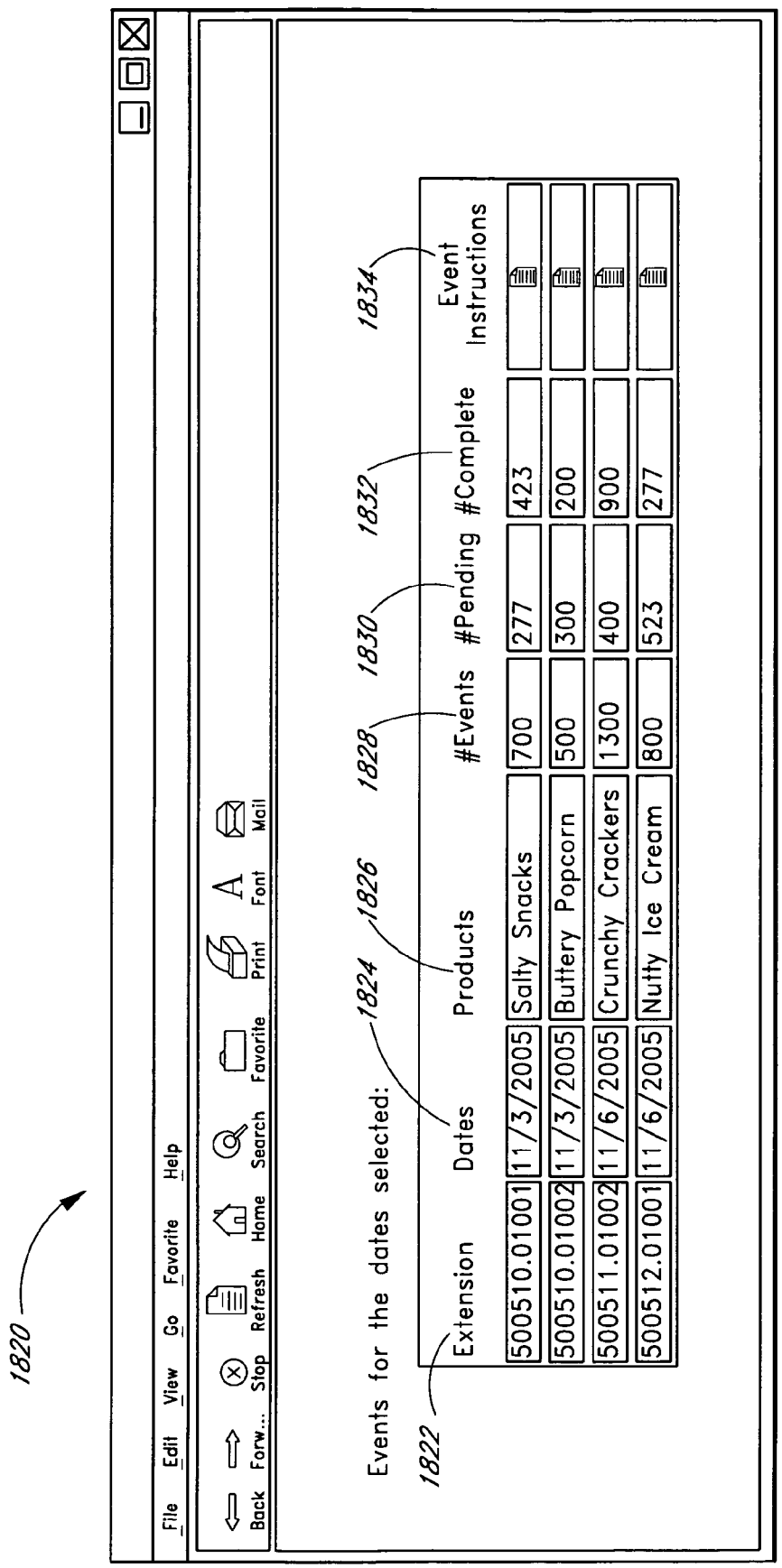

FIGS. 18A-18C are general representations of user interfaces accessible by the retailer systems 1122 for tracking event data for specific retail stores or specific chains of retail stores. For example, a manager of a specific retail store can view events scheduled to take place in the specific retail store on specific dates and times. Thus, the store manager can prepare for upcoming events and can verify that each event operator present in the retail store has been scheduled to be there. As another example, a manager of a group of retail stores or a chain of retail stores can view events scheduled to take place in the group of retail stores or the chain of retail stores. In certain embodiments, the store manager (whether the manager of a single store or a group or chain of stores) can also view the products or services that will be demonstrated during specific events 1316 and the instructions provided to the event operators on how to conduct the specific events 1316.

FIG. 18A illustrates a user interface 1802 displaying an events section 1810, a campaign section 1812, and a reports section 1814. The events section 1810 allows a user to search by date for events 1316 for a specific retail store or chain of retail stores. The campaign section 1812 allows the user to view information related to programs conducted as a public service. For example, the campaign section 1812 may provide hyper-links to information for a campaign to promote healthy eating habits that may, for example, provide free literature to parents and educational toys to children that encourage healthy eating habits. Such campaigns may be conducted independently or in conjunction with an event 1316 promoting products sold by the particular retail store or chain of retail stores. The reports section 1814 allows the user to view the results of past events 1316 including, for example, the number of samples distributed, the number of demonstrated products sold, and the percentage lift or increase in sales as a result of the events 1316. In certain embodiments, the results of past events 1316 are also provided to one or more of the agency systems 1104 and/or the manufacturer systems 1111. For example, one or more of the manufacturer systems 1111 may have access to quarterly or year-to-date reports through the network 1110 to allow the manufacturer to track the progress and success of requested promotions.

FIG. 18B illustrates a user interface 1820 that displays event data for a range of dates selected using the events section 1810 shown in FIG. 18A. The user interface 1820 displays scheduled extension numbers (field 1822), scheduled dates (field 1824), names of demonstrated products (field 1826), number of events 1316 (field 1828) in each extension 1314 identified in the extension number field 1822, number of pending events (field 1830), number of completed events (field 1832), and event instructions hyper-links 1834. Thus, the user, such as a manager of a chain of retail stores, can view general information for extensions 1314 scheduled for the specific chain of retail stores and can download or access the instructions used by the event operators to execute the corresponding events 1316.

FIG. 18C illustrates a user interface 1840 that displays event data for events 1316 corresponding to a specific extension 1314 hosted at one or more retail store chains. The user interface 1840 displays a selected extension number (field 1842), corresponding event numbers (field 1844), assigned agency identifications (field 1846), retailer names (field 1850), store numbers (field 1848) identifying specific retail stores, locations (fields 1852) of the specific retail stores, and event dates (field 1854). Thus, for example, a store manager can determine specific event information for specific retail stores.

Figure 19:
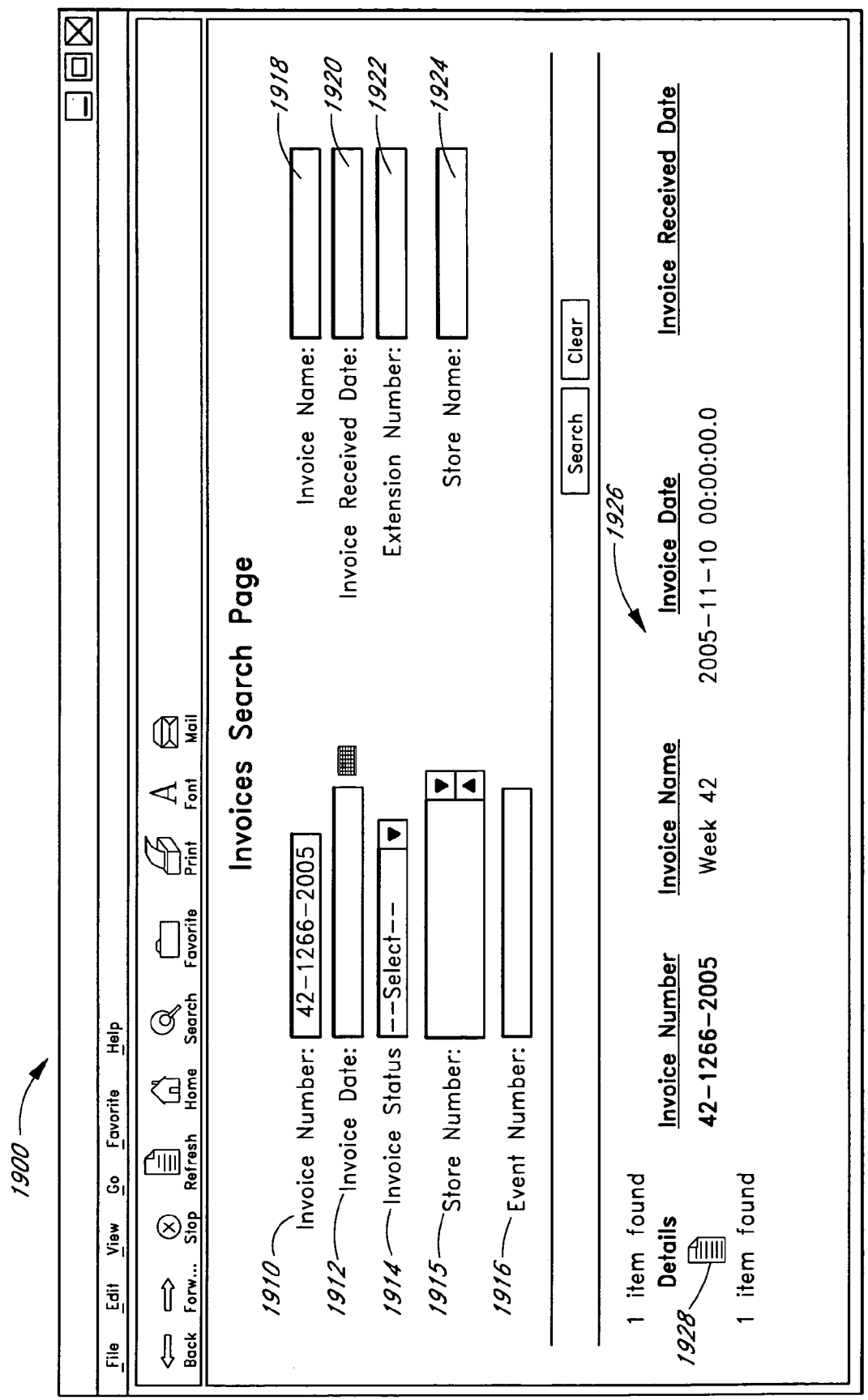
FIG. 19 is a general representation of a computer user interface for tracking financial information related to events 1316.

FIG. 19 is a general representation of a computer user interface 1900 for tracking financial information related to events 1316. The user interface 1900 can be used, for example, by users of the event coordinator system 1102 and/or the agency systems 1104 to coordinate payments for events 1316 by generating, accessing and modifying invoices. In certain embodiments, the user interface 1900 can also be used by users of the event operator systems 1108 to determine when they will be paid for participation in specific events 1316 and how much those payments will be.

The user interface 1900 includes data entry fields for specifying search criteria. For example, a user can search by invoice number (field 1910), invoice date (field 1912), invoice status (field 1914) such as whether the invoice has been approved or paid, store number (field 1915) where a specific event 1316 took place, event number (field 1916), invoice name (field 1918), invoice received date (field 1920) specifying the date the user was first received or had access to the invoice, extension number (field 1922), and store name (field 1924). The user interface 1900 also displays search results 1926 for invoices that meet the search criteria and a hyper-link 1928 to details for specific events 1316 that the user can view, print or download.

Figure 20A:
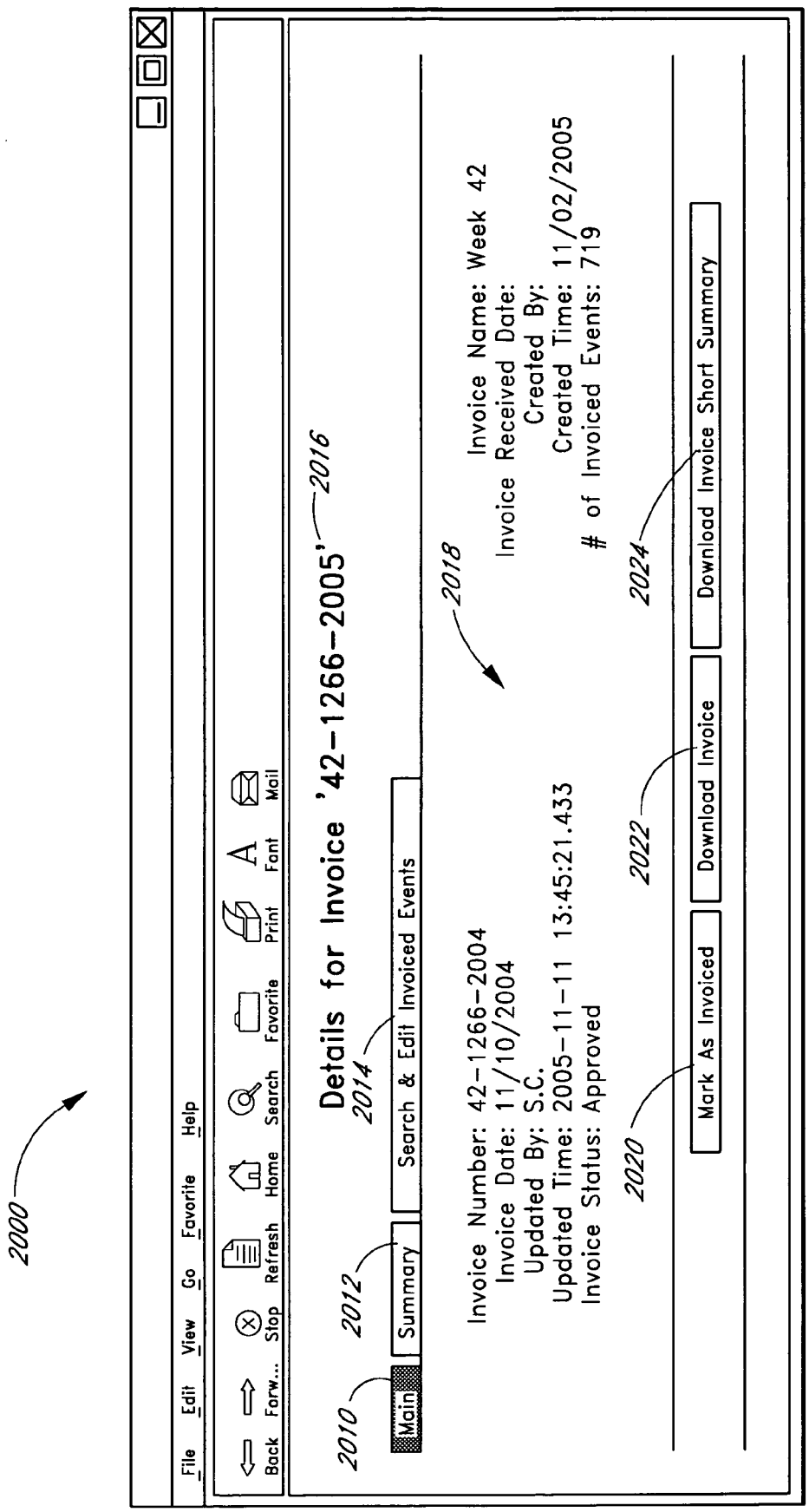
FIGS. 20A-20C are general representations of a user interface for accessing invoice data.
Figure 20B:
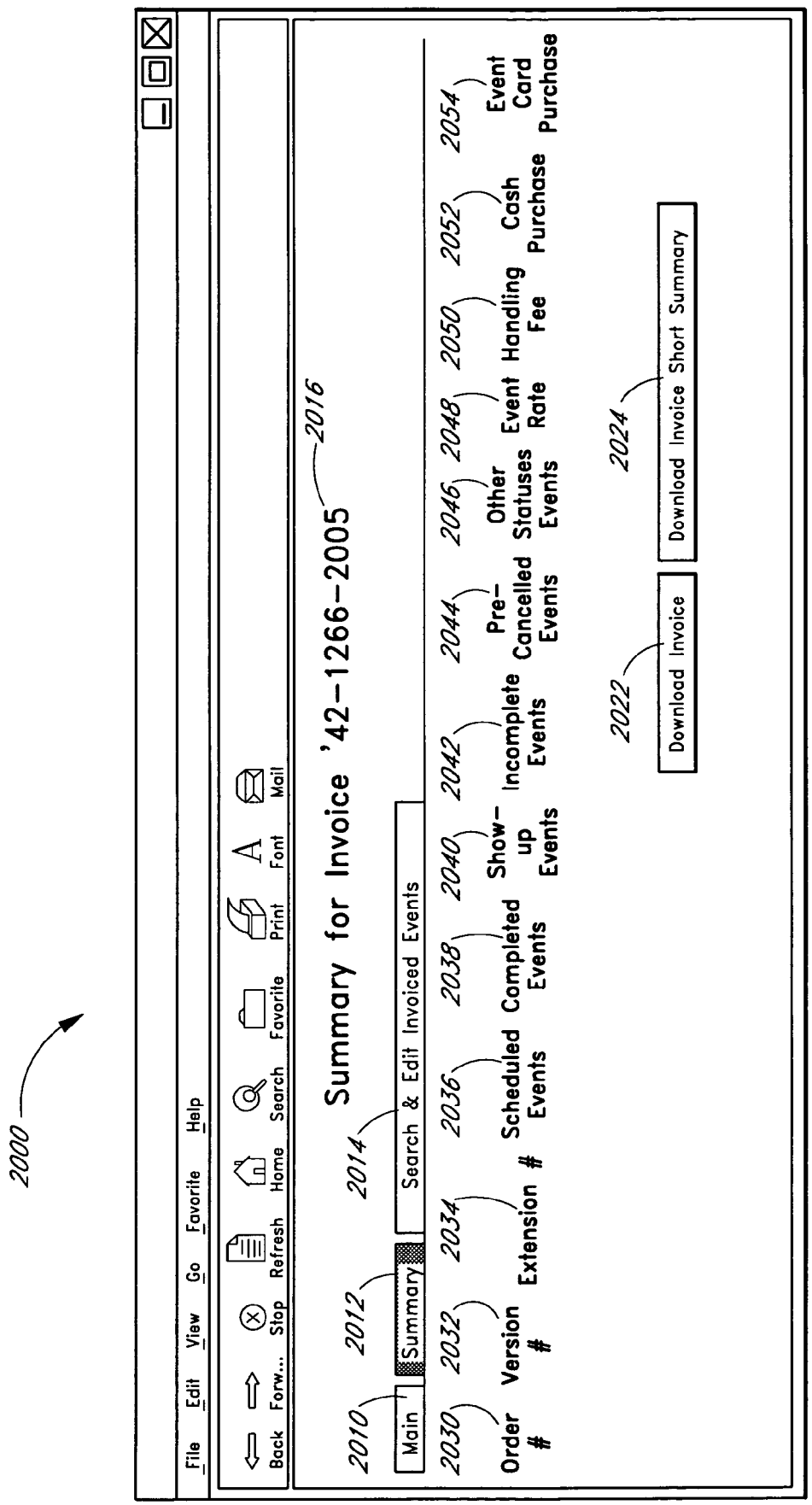
Figure 20C:
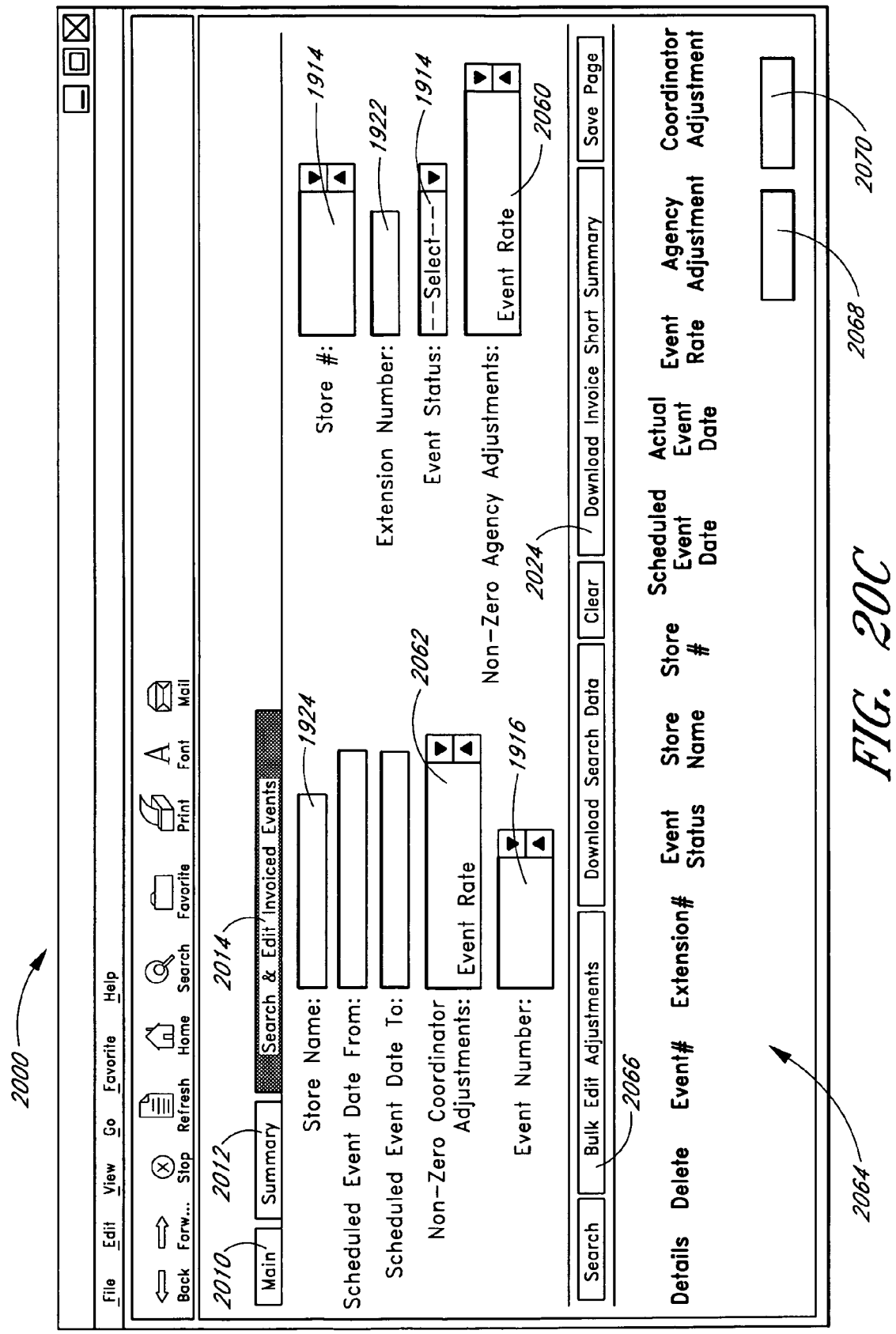

FIGS. 20A-20C are general representations of a user interface 2000 for accessing invoice data. The user interface 2000 can be used, for example, by users of the event coordinator system 1102 and/or the agency systems 1104 to coordinate payments for events 1316 by generating, accessing and modifying invoices. The user interface includes a main tab 2010, a summary tab 2012, and a search and edit invoiced events tab 2014. FIG. 20A illustrates the main tab 2010 that displays an invoice number 2016 for a selected invoice and general information 2018 corresponding to the selected invoice. The main tab 2010 also includes a first button 2020 for changing the status of the selected invoice to "invoiced" when processed according to standard accounting practices. The main tab 2010 also includes a second button 2022 to download the selected invoice and a third button 2024 to download a short summary of the selected invoice.

FIG. 20B illustrates the summary tab 2012 that displays a summary for the selected invoice corresponding to the displayed invoice number 2016. For example, the summary tab 2012 displays an order number (field 2030) of a particular order 1310, a version number (field 2032) of a particular version 1312 of the order 1310, an extension number (field 2034) of a particular extension 1314 of the version 1312, and an event number for scheduled events 1316 (field 2036) in the extension 1314. The summary tab 2012 also displays status information for the scheduled events 1316 including the number of completed events (field 2038), the number of show-up events (field 2040) where an event operator arrived at an event location but was turned away by a store manager, the number of incomplete events (field 2042) where an event operator did not show-up at an event location, the number of pre-cancelled events (field 2044), and the number of events having other statuses (field 2046). The summary tab 2012 also includes financial information such as a rate (field 2048) paid per event, a handling fee (field 2050), a cash purchase amount (field 2052), and an event card 702 purchase amount (field 2054).

FIG. 20C illustrates the search and edit invoiced events tab 2014 that a user can access to modify or request modifications to a particular invoice or group of invoices. The search and edit invoiced events tab 2014 includes data entry fields such as those discussed above in relation to FIG. 19 for specifying search criteria. A user can also search for invoices based at least in part on invoices that had non-zero adjustments requested by an agency (field 2060) and/or non-zero adjustments made by the event coordinator (field 2062). The search and edit invoiced events tab 2014 includes a search results section 2064 for displaying search results for invoices that meet the search criteria. The user can select a "bulk edit adjustment button" 2066 to edit a group of invoices that meet the search criteria or the user can edit specific invoices (not shown) from the search results section 2064. For example, an agency can request invoice adjustments by entering an adjusted dollar amount in an "agency adjustment" field 2068 and the event coordinator can make invoice adjustments by entering an adjusted dollar amount in a "coordinator adjustment" field 2070. In certain embodiments, once the event coordinator approves a particular invoice, it is automatically processed by job costing or other finance software configured to account for payments made to the agencies.

Although the present invention has been described with reference to specific embodiments, other embodiments will occur to those skilled in the art. It is to be understood that the embodiments described above have been presented by way of example, and not limitation, and that the invention is defined by the appended claims.

What is claimed is:

1. A method for monitoring the participation of event operators working remotely at promotional events, the method comprising:
   providing a promotional event request interface accessible to an event requester over a network, said promotional event request interface comprising one or more selection tools configured to allow the event requester to provide order information for a promotional event;
   receiving via the promotional event request interface, the order information for the promotional event, the order information comprising one or more requested locations for the promotional event, one or more requested times for the promotional event, and one or more requested products or services for the promotional event;
   enrolling one or more event operators to work on the promotional event, the enrolling comprising storing, in a computer readable medium, an association between the promotional event and one or more event cards that uniquely identify the one or more event operators;
   using the one or more event cards with one or more card readers to purchase one or more items for the promotional event, wherein one or more start times are generated when the one or more event cards are used with the one or more card readers to purchase the one or more items for the promotional event;
   comparing the one or more start times to the one or more requested times using one or more computer processors in communication with the computer readable medium to determine participation information for the one or more event operators; and
   providing a promotional event tracking interface over the network, the promotional event tracking interface displaying the participation information for the one or more event operators enrolled for the promotional event.

2. The method of claim 1, wherein the promotional event tracking interface is accessible to the event requester.

3. The method of claim 2, further comprising:
   adjusting a rate at which the event requester pays for the promotional event based at least in part on the comparison of the one or more start times to the one or more requested times; and
   displaying the adjusted rate on the promotional event tracking interface.

4. The method of claim 1, further comprising:
   providing the order information to a card administration system;
   providing the one or more event cards to the one or more event operators; and
   instructing the one or more event operators to activate the one or more event cards by contacting the card administration system.

5. The method of claim 1, further comprising instructing the one or more event operators to use the one or more event cards to purchase the one or more items for conducting the promotional event.

6. The method of claim 1, further comprising instructing the one or more event operators to use the one or more event cards to record a starting time and an ending time of the promotional event.

7. The method of claim 1, wherein the enrolling further comprises assigning an agency to staff the promotional event by notifying the agency of the promotional event through a promotional event coordinating interface accessible over the network.

8. The method of claim 7, further comprising providing instructions for executing the promotional event to the agency through the promotional event coordinating interface.

9. The method of claim 7, further comprising receiving the identities of the one or more event operators from the agency through the promotional event coordinating interface.

10. The method of claim 7, wherein the promotional event tracking interface is accessible to the agency, and the method further comprises:
    providing the participation information to the agency through the promotional event tracking interface;
    providing financial information to the agency through the promotional event tracking interface, wherein the financial information includes a first rate at which the agency is paid for the promotional event; and
    receiving a request from the agency through the promotional event tracking interface to change the first rate to a second rate, wherein the second rate is based at least in part on the participation information provided to the agency.

11. The method of claim 1, further comprising providing event information to a promotional event coordinating interface accessible to the one or more event operators through the network, wherein the event information is selected from the group comprising instructions for executing the promotional event, store report forms, and payment information.

12. The method of claim 1, further comprising displaying product information on the promotional event tracking interface, wherein the product information comprises an amount of product distributed as free samples during the promotional event and an amount of the product sold during the promotional event.

13. The method of claim 12, further comprising:
    comparing the product information to an amount of the product sold prior to the promotional event to determine a percentage lift in sales of the product; and
    displaying the percentage lift on the promotional event tracking interface.

14. The method of claim 13, further comprising:
    adjusting a rate at which the event requester pays for the promotional event based at least in part on the percentage lift; and
    displaying the adjusted rate on the promotional event tracking interface.

15. The method of claim 1, further comprising:
    receiving report data from the one or more event operators; and
    in response to receiving the report data, changing a status of the promotional event from a pending status to a completed status.

16. The method of claim 15, wherein the report data is received through a voice recognition unit.

17. The method of claim 1, wherein the data generated by use of the one or more event cards comprises one or more actual locations where the one or more event cards are read by the one or more card-readers, and wherein the participation information is generated at least in part by comparing the one or more actual locations where the one or more event cards are read to the one or more requested locations for the promotional event.

18. The method of claim 1, further comprising:

generating a list of authorized items for the promotional event based at least in part on the one or more requested products or services, wherein the data generated by use of the one or more event cards comprises one or more actual products purchased using the one or more event cards; and generating and storing purchase information for the one or more event operators, the purchase information generated at least in part by comparing the actual products purchased using the one or more event cards to the list of authorized items for the promotional event, wherein the promotional event tracking interface displays the purchase information for the one or more event operators enrolled for the promotional event.

* * * * *

UNITED STATES PATENT AND TRADEMARK OFFICE
CERTIFICATE OF CORRECTION

PATENT NO. : 7,797,191 B2
APPLICATION NO. : 11/059746
DATED : September 14, 2010
INVENTOR(S) : Cotten et al.

It is certified that error appears in the above-identified patent and that said Letters Patent is hereby corrected as shown below:

Column 7, Line 45, "event operator 10S" should be changed to --event operator 105--

Column 27, Line 53, "(field 0.1760) that" should be changed to --(field 1760) that--

Signed and Sealed this
Thirteenth Day of September, 2011

David J. Kappos
*Director of the United States Patent and Trademark Office*